United States Patent
Takata et al.

(10) Patent No.: US 12,216,378 B2
(45) Date of Patent: Feb. 4, 2025

(54) PROJECTION DEVICE AND PROJECTION METHOD

(71) Applicant: NEC Corporation, Tokyo (JP)

(72) Inventors: Koya Takata, Tokyo (JP); Hisashi Mizumoto, Tokyo (JP); Fujio Okumura, Kanagawa (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 18/282,045

(22) PCT Filed: Feb. 10, 2022

(86) PCT No.: PCT/JP2022/005240
§ 371 (c)(1),
(2) Date: Sep. 14, 2023

(87) PCT Pub. No.: WO2022/201942
PCT Pub. Date: Sep. 29, 2022

(65) Prior Publication Data
US 2024/0045303 A1     Feb. 8, 2024

(30) Foreign Application Priority Data
Mar. 22, 2021 (JP) ................................. 2021-047566

(51) Int. Cl.
*G02F 1/29* (2006.01)
*G02F 1/1335* (2006.01)
(Continued)

(52) U.S. Cl.
CPC ............. *G02F 1/29* (2013.01); *G03B 21/005* (2013.01); *G02F 1/1336* (2013.01)

(58) Field of Classification Search
CPC . G02F 1/01; G02F 1/13; G02F 1/1335; G02F 1/133526; G02F 1/1336; G02F 1/29; G03B 21/005; H04B 10/11
See application file for complete search history.

(56) References Cited

U.S. PATENT DOCUMENTS

| | | |
|---|---|---|
| 2009/0207466 A1 | 8/2009 | Bucklay |
| 2015/0109269 A1* | 4/2015 | Sung .................... H04N 13/305 345/206 |
| 2017/0261746 A1* | 9/2017 | Tam ...................... H04N 13/332 |

FOREIGN PATENT DOCUMENTS

| | | |
|---|---|---|
| WO | 2018/056199 A1 | 3/2018 |
| WO | 2019/116526 A1 | 6/2019 |
| WO | 2022/137777 A1 | 6/2022 |

OTHER PUBLICATIONS

International Search Report for PCT Application No. PCT/JP2022/005240, mailed on May 10, 2022.
(Continued)

*Primary Examiner* — Thoi V Duong
(74) *Attorney, Agent, or Firm* — Sughrue Mion, PLLC

(57) ABSTRACT

A projection device a includes a light source that emits parallel light, a spatial light modulator that has a modulation part that modulates a phase of the parallel light emitted from the light source, a liquid crystal projection lens that includes a liquid crystal region on which modulated light modulated by the spatial light modulator is incident and that projects the modulated light in a lens region dynamically formed in the liquid crystal region as projection light, and a control unit that causes the lens region to be formed at a desired position in the liquid crystal region of the liquid crystal lens, sets a phase image corresponding to the projection light projected toward a projection target, to the modulation part of the spatial light modulator, and controls the light source to emit the parallel light toward the modulation part to which the phase image is set.

9 Claims, 27 Drawing Sheets

(51) Int. Cl.
*G03B 21/00* (2006.01)
*G02F 1/13357* (2006.01)

(56) References Cited

OTHER PUBLICATIONS

English translation of Written opinion for PCT Application No. PCT/JP2022/005240, mailed on May 10, 2022.

* cited by examiner

BEFORE CHANGE

AFTER CHANGE

BEFORE CHANGE

AFTER CHANGE

BEFORE CHANGE

AFTER CHANGE

BEFORE CHANGE

AFTER CHANGE

Fig.7A  BEFORE CHANGE
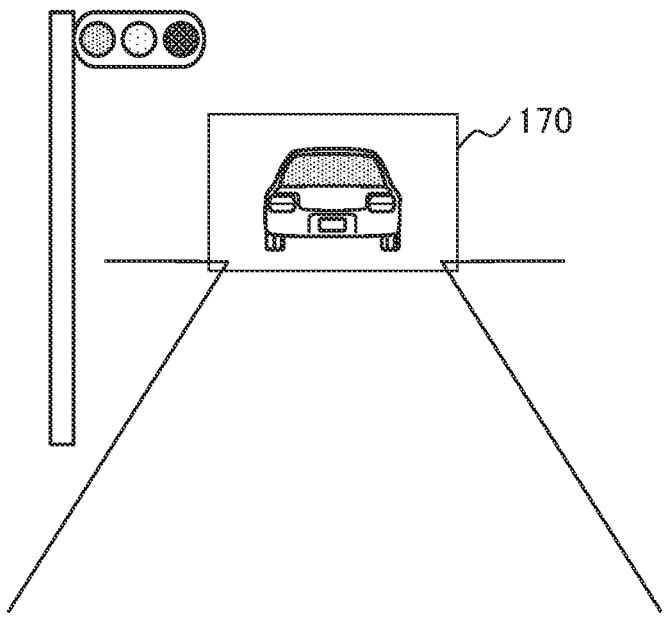
Fig.7B  AFTER CHANGE
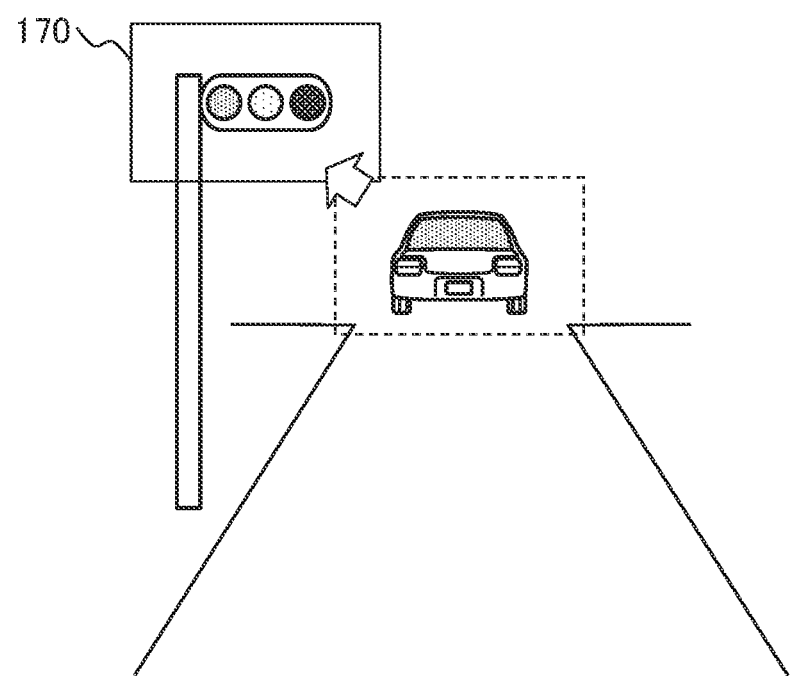

BEFORE CHANGE

AFTER CHANGE

BEFORE CHANGE

AFTER CHANGE

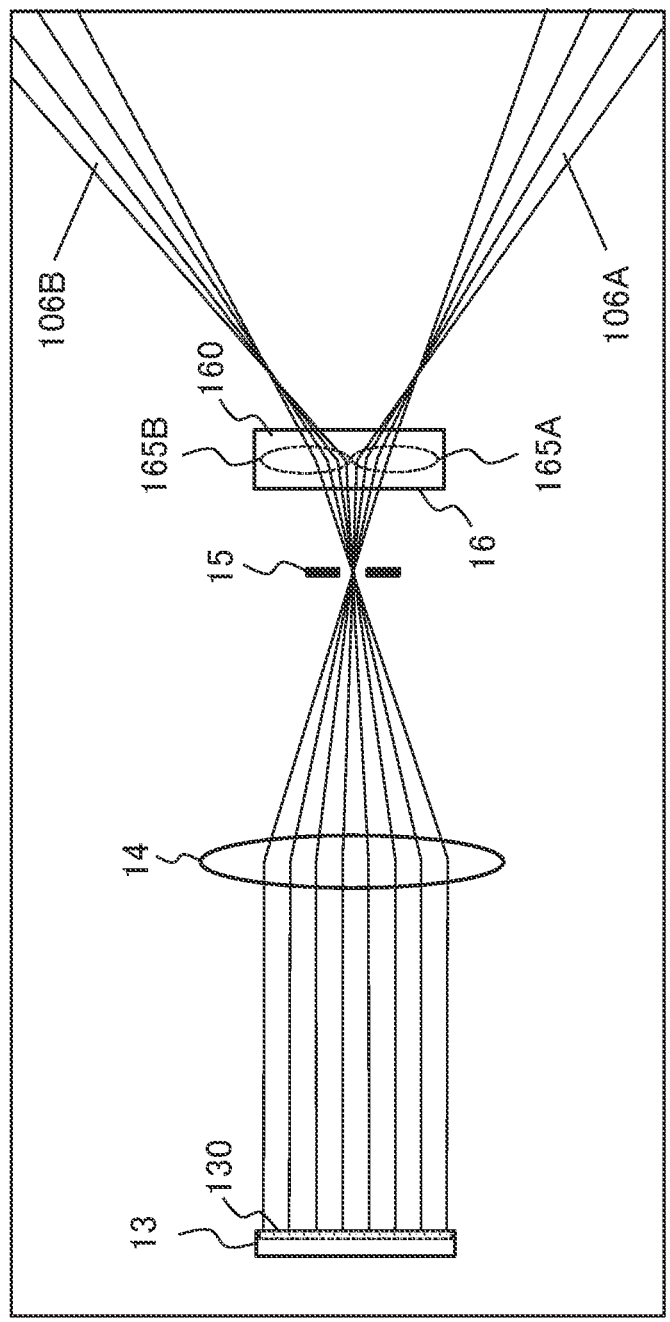

BEFORE CHANGE

AFTER CHANGE

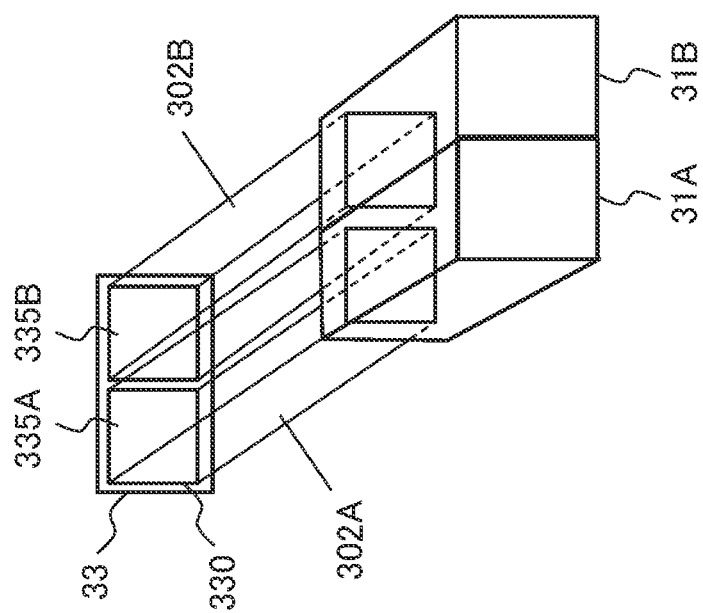

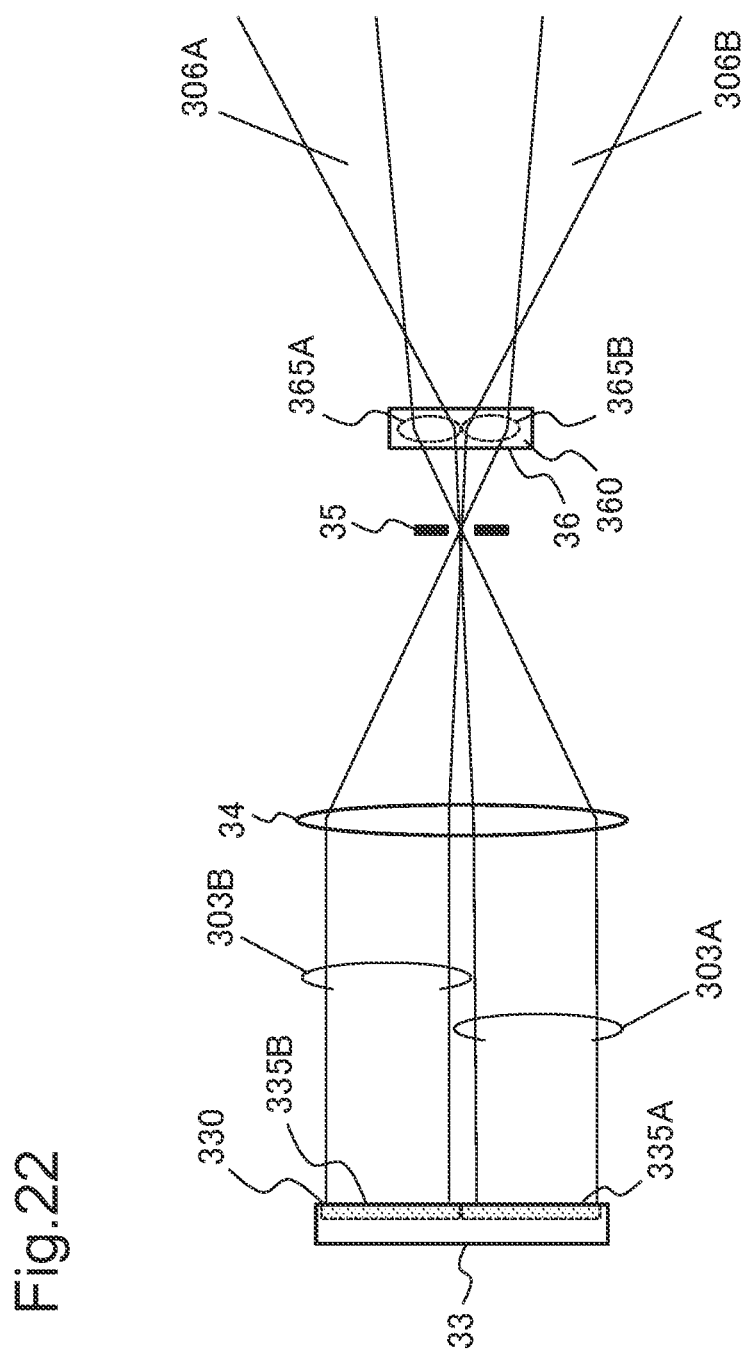

PROJECTION DEVICE AND PROJECTION METHOD

This application is a National Stage Entry of PCT/JP2022/005240 filed on Feb. 10, 2022, which claims priority from Japanese Patent Application 2021-047566 filed on Mar. 22, 2021, the contents of all of which are incorporated herein by reference, in their entirety.

TECHNICAL FIELD

The present disclosure relates to a projection device or the like that projects a spatial light signal.

BACKGROUND ART

When the projection angle of projection light projected from the projection device is increased in order to expand the projection range, the energy density of the projection light decreases and the reaching distance is limited. If the projection range is too wide, a displayed image becomes rough. On the other hand, if the projection angle of projection light is decreased to lengthen the reaching distance, the projection range becomes narrow. If the projection range becomes too narrow, the displayed image becomes unclear with decrease in resolution. There is a demand for a projection device that is capable of eliminating such a trade-off and displaying a high-definition image in a wide range.

PTL 1 discloses a projection device including a light source, a spatial light modulator, a control unit, and a projection optical system. The control unit tiles the modulation part of the spatial light modulator in a plurality of regions having long axes in the first direction. The control unit sets a phase image corresponding to an image set in accordance with the aspect ratio of tiling of the modulation part in each of the plurality of regions tiled to the modulation part. The control unit controls the light source so that parallel light is emitted toward the modulation part to which the phase image is set. The projection optical system includes a projection lens that projects in accordance with the aspect ratio of tiling of the modulation part.

CITATION LIST

Patent Literature

PTL 1: Japanese Patent Application No. 2020-210947

SUMMARY OF INVENTION

Technical Problem

The projection light projected by the device of PTL 1 is projected in a projection range matched with tiling of the modulation part, so that a high energy density can be maintained even at a farther distance. In addition, since the projection range of the projection light projected from the device of PTL 1 is compressed in accordance with the tiling set to the modulation part of the spatial light modulator, the image formed by the projection light has no distortion. Therefore, according to the device of PTL 1, it is possible to project projection light having a high energy density to a distant object without distortion. However, PTL 1 does not clearly disclose a method of projecting an image in an arbitrary projection direction.

An object of the present disclosure is to provide a projection device or the like that is capable of projecting a high-definition image in an arbitrary projection direction.

Solution to Problem

A projection device according to an aspect of the present disclosure includes a light source that emits parallel light, a spatial light modulator that has a modulation part that modulates a phase of the parallel light emitted from the light source, a liquid crystal projection lens that includes a liquid crystal region on which modulated light modulated by the spatial light modulator is incident and that projects the modulated light in a lens region dynamically formed in the liquid crystal region as projection light, and a control unit that causes the lens region to be formed at a desired position in the liquid crystal region of the liquid crystal lens, sets a phase image corresponding to the projection light projected toward a projection target, to the modulation part of the spatial light modulator, and controls the light source to emit the parallel light toward the modulation part to which the phase image is set.

In a projection method according to an aspect of the present disclosure, a lens region is formed at a desired position in a liquid crystal region of a liquid crystal lens, a phase image corresponding to projection light projected toward a projection target is set to a modulation part of a spatial light modulator, and a light source is controlled in such a way as to emit parallel light toward the modulation part to which the phase image is set.

Advantageous Effects of Invention

According to the present disclosure, it is possible to provide a projection device or the like that is capable of projecting a high-definition image in an arbitrary projection direction.

BRIEF DESCRIPTION OF DRAWINGS

FIG. 7A is a conceptual diagram for describing a projection range of projection light in Control Example 2 of the projection device according to the first example embodiment.

FIG. 7B is a conceptual diagram for describing the projection range of projection light in Control Example 2 of the projection device according to the first example embodiment.

FIG. 11 is a conceptual diagram for describing an example of an optical path in Control Example 4 of the projection device according to the first example embodiment.

FIG. 21 is a conceptual diagram for describing an example of an optical path of parallel light emitted from a light source of the projection device according to the third example embodiment.

FIG. 22 is a conceptual diagram for describing an example of an optical path of modulated light modulated by a modulation part of a spatial light modulator of the projection device according to the third example embodiment.

EXAMPLE EMBODIMENT

Figure 1:
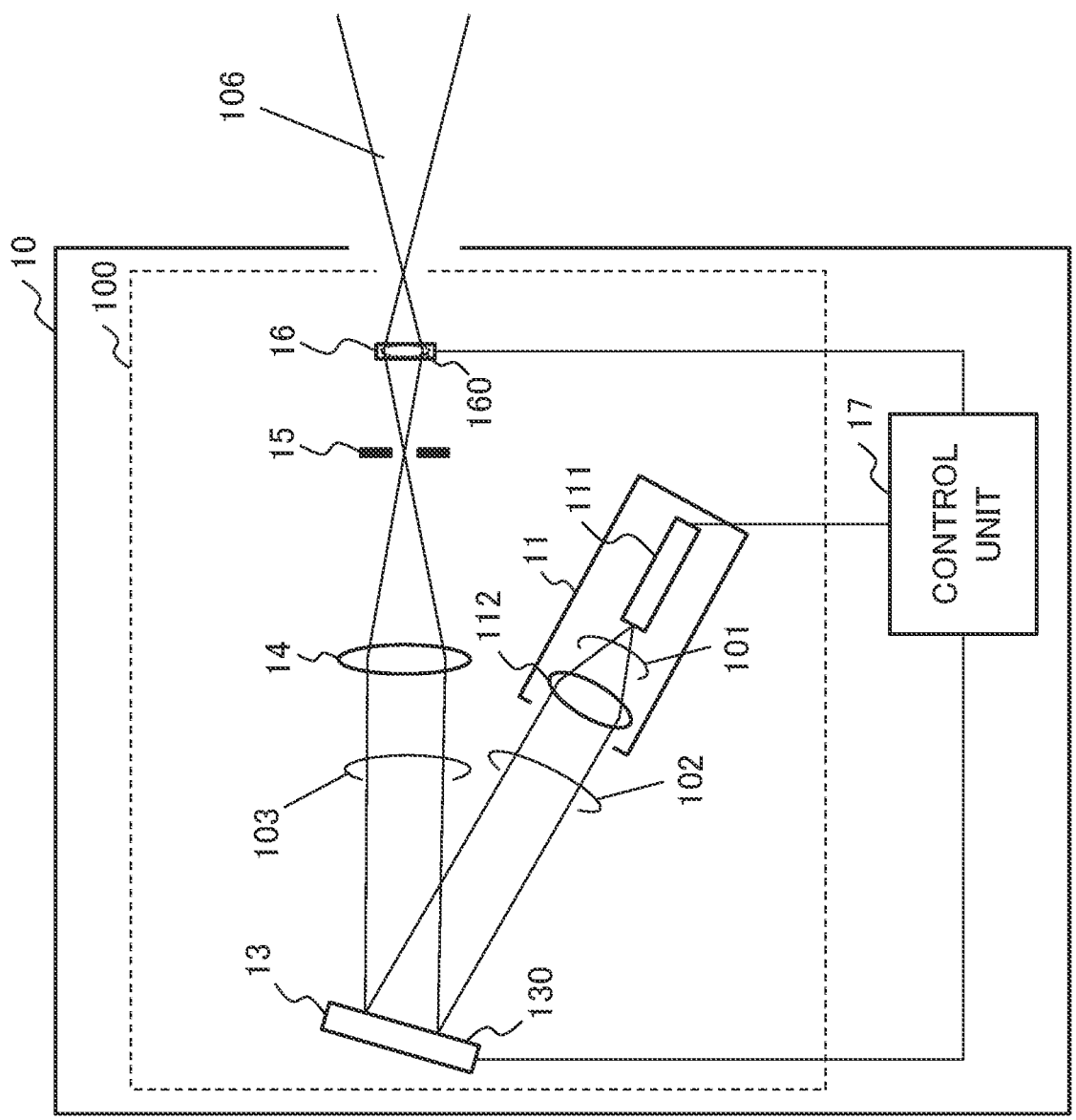
FIG. 1 is a conceptual diagram illustrating an example of a configuration of a projection device according to a first example embodiment.

Hereinafter, example embodiments of the present invention will be described with reference to the drawings. However, the example embodiments described below have technically preferable limitations for carrying out the present invention, but the scope of the invention is not limited to the following. In all the drawings used for describing the following example embodiments, the same reference numerals are given to the same parts unless otherwise specified. In all the drawings used for describing the following example embodiments, reference numerals of similar components may be omitted. In the following example embodiments, repeated description of similar components and operations may be omitted.

In all the drawings used for description of the following example embodiments, the directions of the arrows in the drawings are merely examples, and do not limit the directions of light and signals. Lines indicating trajectories of light in the drawings are conceptual, and do not accurately indicate actual traveling directions or states of light. For example, in the following drawings, changes in the traveling direction or state of light due to refraction, reflection, diffusion, or the like at an interface between air and a substance may be omitted, or a light flux may be expressed by one line.

First Example Embodiment

First, a projection device according to a first example embodiment will be described with reference to the drawings. The projection device of the present example embodiment is used for optical spatial communication and distance measurement in which optical signals propagating in a space (hereinafter, also referred to as spatial light signals) are transmitted and received without using a medium such as an optical fiber. The projection device of the present example embodiment may be used for applications other than optical spatial communication and distance measurement as long as it is used for projecting spatial light.

(Configuration)

FIG. 1 is a conceptual diagram illustrating an example of a configuration of a projection device 10 of the present example embodiment. The projection device 10 includes a light source 11, a spatial light modulator 13, a Fourier transform lens 14, an aperture 15, a liquid crystal projection lens 16, and a control unit 17. The light source 11, the spatial light modulator 13, the Fourier transform lens 14, the aperture 15, and the liquid crystal projection lens 16 constitute a projection unit 100. The Fourier transform lens 14, the aperture 15, and the liquid crystal projection lens 16 constitute a projection optical system. FIG. 1 is a lateral view of an internal configuration of the projection device 10. FIG. 1 is a conceptual diagram, and does not accurately represent a positional relationship between components, a traveling direction of light, and the like.

The light source 11 includes an emitter 111 and a collimator 112. The emitter 111 emits a laser light 101 in a predetermined wavelength band under the control of the control unit 17. A wavelength of the laser light 101 emitted from the light source 11 is not particularly limited. For example, the light emitter 111 emits the laser light 101 in the visible or infrared wavelength band. For example, in the case of near infrared rays of 800 to 900 nanometers (nm), since the laser class can be increased, the sensitivity can be improved by about one digit as compared with other wavelength bands. For example, by using a gallium arsenide (GaN)-based laser light source makes it possible to emit the infrared laser light 101 in a wavelength band of 1.55 micrometers (μm). For infrared rays in a wavelength band of 1.55 μm, a high-power laser light source of about 100 milliwatts (mW) can be used. The longer the wavelength of the laser light 101 is, the larger the diffraction angle can be made and the higher the energy can be set.

The collimator 112 converts the laser light 101 emitted from the emitter 111 into parallel light 102. The laser light 101 emitted from the emitter 111 is converted into the parallel light 102 by the collimator 112, and is emitted from the light source 11. The parallel light 102 emitted from the light source 11 travels toward the modulation part 130 of the spatial light modulator 13.

As illustrated in FIG. 1, the incident angle of the parallel light 102 is set non-perpendicular to the modulation part 130 of the spatial light modulator 13. An emission axis of the parallel light 102 emitted from the light source 11 is inclined with respect to the modulation part 130 of the spatial light modulator 13. If the emission axis of the parallel light 102 is inclined with respect to the modulation part 130 of the spatial light modulator 13, the parallel light 102 can be entered without using a beam splitter. Therefore, the utilization efficiency of light can be improved. In addition, when the emission axis of the parallel light 102 is set inclined with respect to the modulation part 130 of the spatial light modulator 13, the size of the projection unit 100 can be made compact.

The spatial light modulator 13 includes the modulation part 130 irradiated with the parallel light 102. In the modulation part 130 of the spatial light modulator 13, a pattern (also referred to as a phase image) corresponding to the image displayed by the projection light 106 is set under the control of the control unit 17. Modulated light 103 modulated by the modulation part 130 of the spatial light modulator 13 travels toward the incidence surface of the Fourier transform lens 14.

For example, the spatial light modulator 13 is implemented by a spatial light modulator using ferroelectric liquid crystal, homogeneous liquid crystal, vertical alignment liquid crystal, or the like. For example, the spatial light modulator 13 can be implemented by liquid crystal on silicon (LCOS). Furthermore, the spatial light modulator 13 may be implemented by a micro electro mechanical system (MEMS). In the phase modulation-type spatial light modulator 13, the energy can be concentrated on the portion of the image by operating to sequentially switch among the portions that project the projection light 106. Therefore, in the case of using the phase modulation-type spatial light modulator 13, if the output of the light source 11 is the same, the image can be displayed bright in comparison with other methods.

The modulation part 130 of the spatial light modulator 13 is divided into a plurality of regions (also referred to as tiling). For example, the modulation part 130 is divided into rectangular regions (also referred to as tiles) having a desired aspect ratio. The phase image generated by iterative Fourier transform is allocated to each of the plurality of tiles set to the modulation part 130. Each of the plurality of tiles includes a plurality of pixels. A phase image corresponding to a projected image is set to each of the plurality of tiles. The phase images set to the plurality of tiles may be the same or different. For example, each of the plurality of tiles includes 256×256 pixels or 512×512 pixels. For example, in a case where the total number of pixels of the modulation part 130 is 1080×1920 pixels and the number of pixels of each tile is 256×256 pixels, four tiles in the vertical direction and seven tiles in the horizontal direction are allocated to the modulation part 130. In general tiling, in order to improve the calculation speed of a phase image, the number of pixels constituting a tile is set to a 2 n-th power resolution (n is a natural number).

The phase image generated by the iterative Fourier transform is tiled to each of the plurality of tiles allocated to the modulation part 130. For example, a phase image generated in advance is set to each of the plurality of tiles. When the modulation part 130 is irradiated with the parallel light 102 in a state where the phase images are set to the plurality of tiles, the modulated light 103 that forms an image corresponding to the phase image of each tile is emitted. As the number of tiles set to the modulation part 130 increases, a clear image can be displayed. However, when the number of pixels of each tile decreases, the resolution decreases. Therefore, the size and number of tiles set to the modulation part 130 are set according to the use purpose. For example, when the number of tiles is less than six, the projected image may be disturbed, and thus the number of tiles is preferably set to six or more.

The Fourier transform lens 14 is an optical lens that Fourier-transforms the modulated light 103 modulated by the spatial light modulator 13 and forms an image generated by projecting the modulated light 103 at infinity, at a focal position near the aperture 15. Instead of the Fourier transform lens 14, a virtual lens may be used. When the virtual lens is used, the Fourier transform lens 14 can be omitted. For example, a composite image of a phase image corresponding to an image formed by the projection light 106 projected from the projection device 10 and a virtual lens image for condensing the modulated light 103 at a focal position near the aperture 15 may be set to the modulation part 130. The light condensed by the Fourier transform lens 14 passes through the opening of the aperture 15 and enters the liquid crystal projection lens 16.

The aperture 15 is a frame that blocks high-order light included in the light focused by the Fourier transform lens 14 and limits the outer edge of the display area. The opening of the aperture 15 is opened smaller than the outer periphery of the display area at the position of the aperture 15, and is placed so as to block the peripheral area of the image at the position of the aperture 15. For example, the opening of the aperture 15 is formed in a rectangular shape or a circular shape. The aperture 15 is preferably placed at a focal position of the Fourier transform lens 14. The aperture 15 may be shifted from the focal position of the Fourier transform lens 14 as long as the aperture 15 can block high order light and limit the display area. A 0th-order light blocking member (not illustrated) that blocks zero-order light may be provided at the position of the aperture 15. The zero-order light blocking member is a member that has a light absorbing/reflecting portion. The zero-order light blocking member is arranged on an optical path of zero-order light. For example, a transparent member such as glass having a portion blackened so as not to transmit light can be used as the zero-order light removing member. In addition, a portion that blocks the zero-order light included in the modulated light 103 may be provided inside the opening of the aperture 15.

The liquid crystal projection lens 16 is a lens that enlarges the light focused by the Fourier transform lens 14 in accordance with a displayed image. The liquid crystal projection lens 16 includes at least one liquid crystal lens. The liquid crystal lens is a lens capable of dynamically changing a projection direction and a projection angle. The liquid crystal projection lens 16 may be formed of a single lens, or a combination of a plurality of lenses. For example, the liquid crystal projection lens 16 has a configuration in which one liquid crystal lens and at least one optical lens are combined. The type and number of lenses constituting the liquid crystal projection lens 16 are not particularly limited. Hereinafter, an example in which the liquid crystal projection lens 16 includes one liquid crystal lens will be described, but the liquid crystal projection lens 16 is not limited to one liquid crystal lens.

The liquid crystal projection lens 16 is a lens including a liquid crystal region 160 in which a lens region can be formed at an arbitrary position. For example, the liquid crystal region 160 of the liquid crystal projection lens 16 has a structure in which a liquid crystal lens body with liquid crystal sealed between two alignment films is sandwiched between two transparent conductive films. In the liquid crystal region 160 of the liquid crystal projection lens 16, the refractive index of the liquid crystal region 160 changes according to the voltage applied between the two transparent conductive films. The range of the focal length of the liquid crystal projection lens 16 is set according to the refractive index of the material constituting the liquid crystal projection lens 16.

A lens region is formed at an arbitrary position in the liquid crystal region 160 of the liquid crystal projection lens 16 under the control of the control unit 17. For example, the lens region can be formed at an arbitrary position in the liquid crystal region 160 of the liquid crystal projection lens 16 by adjusting the portion to which the voltage is applied. In the lens region formed in liquid crystal projection lens 16, the projection direction, the projection distance, and the projection angle can be set according to the applied voltage. A plurality of lens regions can be formed in the liquid crystal region 160 of the liquid crystal projection lens 16. The projection direction, the projection distance, and the projection angle of the plurality of lens regions formed in the liquid crystal region 160 of the liquid crystal projection lens 16 can be individually set by adjusting the applied voltage. In the liquid crystal region 160, a lens region corresponding to a free-form lens can be formed. Forming the lens region corresponding to the free-form lens allows the projection direction and the projection angle to be more flexibly controlled.

The liquid crystal region 160 of the liquid crystal projection lens 16 diffracts the modulated light 103 incident on the lens region from the incidence surface, and projects the projection light 106 in the set projection direction and projection angle under the control of the control unit 17. That is, the projection direction and the projection angle of the optical signal incident on the liquid crystal projection lens 16 are controlled under the control of the control unit 17, and the optical signal is projected toward an arbitrary projection target. The projection light 106 projected by the liquid crystal projection lens 16 forms an image corresponding to the phase image set to the modulation part 130 of the spatial light modulator 13 on the projection target surface.

The control unit 17 controls the light source 11, the spatial light modulator 13, and the liquid crystal projection lens 16. The control unit 17 is implemented by a microcomputer including a processor and a memory. The control unit 17 sets a phase image corresponding to the projected image to the modulation part 130 in accordance with the aspect ratio of tiling set to the modulation part 130 of the spatial light modulator 13. For example, the control unit 17 sets a phase image corresponding to an image in accordance with the use purpose such as image display, communication, or distance measurement, to the modulation part 130. The phase image of the projected image may be stored in advance in a storage unit (not illustrated). The shape and size of the projected image are not particularly limited.

The control unit 17 drives the spatial light modulator 13 in such a way as to change a parameter that determines a difference between a phase of the parallel light 102 emitted to the modulation part 130 of the spatial light modulator 13 and a phase of the modulated light 103 reflected by the modulation part 130. The parameter that determines the difference between the phase of the parallel light 102 applied to the modulation part 130 of the spatial light modulator 13 and the phase of the modulated light 103 reflected by the modulation part 130 is a parameter related to optical characteristics such as a refractive index and an optical path length, for example. For example, the control unit 17 adjusts the refractive index of the modulation part 130 by changing the voltage emitted to the modulation part 130 of the spatial light modulator 13. When the refractive index of the modulation part 130 is adjusted, the parallel light 102 emitted to the modulation part 130 is diffracted as appropriate based on the refractive index of each part of the modulation part 130. That is, the phase distribution of the parallel light 102 emitted to the modulation part 130 of the phase modulation-type spatial light modulator 13 is modulated in accordance with the optical characteristics of the modulation part 130. The method of driving the spatial light modulator 13 by the control unit 17 is determined in accordance with the modulation scheme of the spatial light modulator 13.

The control unit 17 forms a lens region for projecting the projection light 106 in the liquid crystal region 160 of the liquid crystal projection lens 16. For example, the control unit 17 controls the projection direction of the projection light 106 by adjusting the position of the lens region in the liquid crystal region 160 of the liquid crystal projection lens 16. For example, the control unit 17 controls a voltage applied to the liquid crystal region 160 of the liquid crystal projection lens 16 to form a lens region at a desired position in the liquid crystal region 160 of the liquid crystal projection lens 16. For example, the control unit 17 controls the projection distance and projection angle of the projection light 106 by increasing or decreasing the refractive index of the lens region in the liquid crystal region 160 of the liquid crystal projection lens 16. The control unit 17 adjusts the refractive index of the lens region by adjusting the voltage applied to the liquid crystal region 160 of the liquid crystal projection lens 16. When the refractive index of the lens region of the liquid crystal region 160 is adjusted, the spatial light signal incident on the liquid crystal projection lens 16 is diffracted as appropriate in accordance with the refractive index of the lens region. That is, the spatial light signal incident on the liquid crystal projection lens 16 is diffracted in accordance with the optical characteristics of the lens region. The method of driving the liquid crystal projection lens 16 by the control unit 17 is not limited to the method described herein.

The control unit 17 drives the emitter 111 of the light source 11 in a state where the phase image corresponding to the image to be displayed is set to the modulation part 130. As a result, the parallel light 102 emitted from the light source 11 is emitted to the modulation part 130 of the spatial light modulator 13 along with a timing of setting the phase image to the modulation part 130 of the spatial light modulator 13. The parallel light 102 emitted to the modulation part 130 of the spatial light modulator 13 is modulated by the modulation part 130 of the spatial light modulator 13. The modulated light 103 modulated by the modulation part 130 of the spatial light modulator 13 is projected from the liquid crystal projection lens 16, as the projection light 106 corresponding to the phase image set to the modulation part 130 of the spatial light modulator 13.

Control Example 1

Figure 2A:
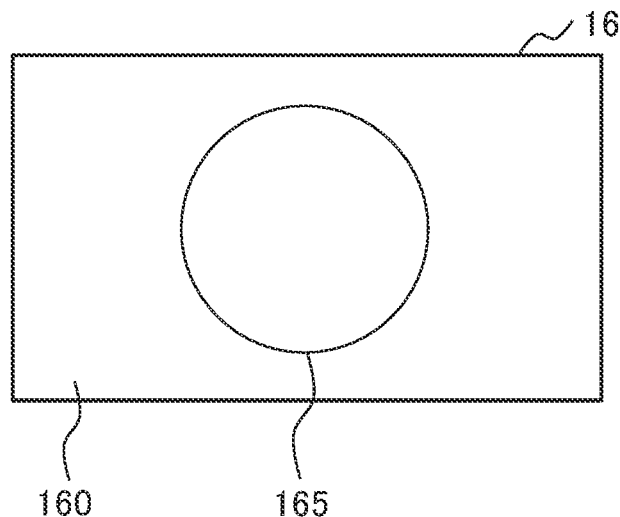
FIG. 2A is a conceptual diagram for describing a lens region formed in a liquid crystal region of a liquid crystal projection lens in Control Example 1 of the projection device according to the first example embodiment.

FIGS. 2A to 4B are conceptual diagrams for describing an example of projection direction control of the liquid crystal projection lens 16 by the control unit 17. FIGS. 2A and 2B are examples in which a lens region 165 is one-dimensionally changed from the position before the change in FIG. 2A to the position after the change in FIG. 2B in the liquid crystal region 160 of the liquid crystal projection lens 16. The examples of FIGS. 2A and 2B are views of the liquid crystal projection lens 16 as seen from the spatial light modulator 13 in the projection direction. In the example of FIGS. 2A and 2B, the lens region 165 is moved leftward from a center portion (a portion surrounded by a broken-line circle) in the liquid crystal region 160 of the liquid crystal projection lens 16. For example, the control unit 17 changes the lens region 165 by adjusting a formation range of the lens region 165 in the liquid crystal region 160 of the liquid crystal projection lens 16.

Figure 2B:
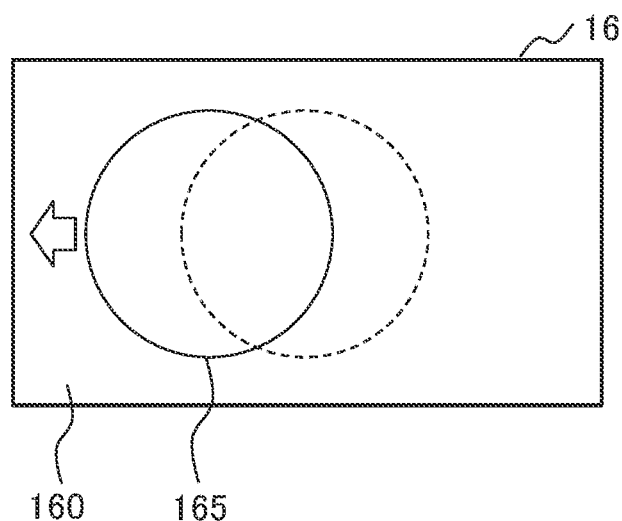
FIG. 2B is a conceptual diagram for describing the lens region formed in the liquid crystal region of the liquid crystal projection lens in Control Example 1 of the projection device according to the first example embodiment.
Figure 3A:
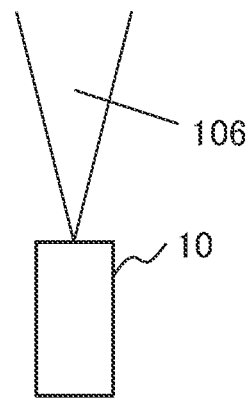
FIG. 3A is a conceptual diagram for describing control of a projection direction of projection light in Control Example 1 of the projection device according to the first example embodiment.
Figure 3B:
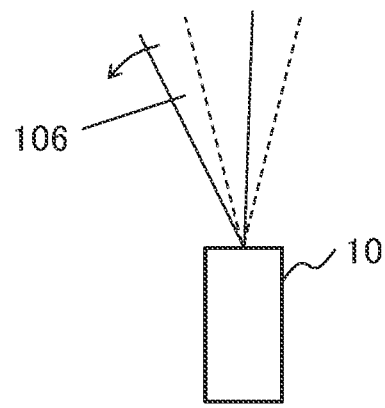
FIG. 3B is a conceptual diagram for describing control of the projection direction of projection light in Control Example 1 of the projection device according to the first example embodiment.

FIGS. 3A and 3B are conceptual diagrams for describing a change in the projection direction of the projection light 106 caused by moving the lens region 165 in the liquid crystal region 160 of the liquid crystal projection lens 16 as illustrated in FIGS. 2A and 2B. The example of FIGS. 3A and 3B presents views of the projection device 10 as seen from the upper viewpoint. In the example of FIGS. 3A and 3B, the projection direction is changed to the left side by one-dimensionally changing the lens region 165 from the position before the change in FIG. 3A to the position after the change in FIG. 3B in the liquid crystal region 160 of the liquid crystal projection lens 16.

Figure 4A:
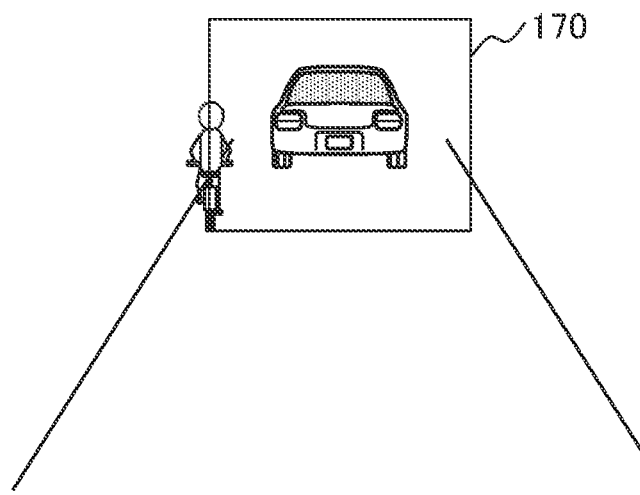
FIG. 4A is a conceptual diagram for describing a projection range of projection light in Control Example 1 of the projection device according to the first example embodiment.
Figure 4B:
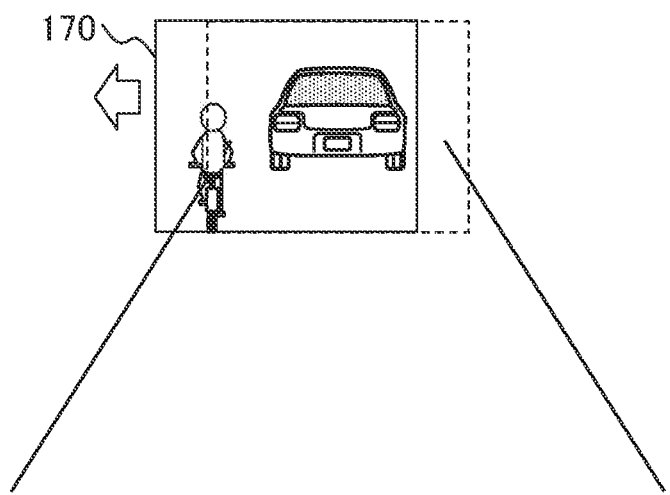
FIG. 4B is a conceptual diagram for describing a projection range of projection light in Control Example 1 of the projection device according to the first example embodiment.

FIGS. 4A and 4B are conceptual diagrams for describing a change in a projection range 170 of the projection light 106 caused by moving the lens region 165 in the liquid crystal region 160 of the liquid crystal projection lens 16 as illustrated in FIGS. 2A and 2B. FIGS. 4A and 4B illustrate an example in which the projection light is projected forward from an automobile equipped with the projection device 10. The inside of the projection range 170 before the change in FIG. 4A includes the entire automobile traveling ahead and a part of a bicycle traveling ahead. The inside of the projection range 170 after the change in FIG. 4B includes the entire automobile and bicycle traveling ahead. For example, as in the projection range 170 after the change in FIG. 4B, when all the objects located in front of the automobile are included in the projection range 170, it is easier to cope with some event.

Second Control Example

Figure 5A:
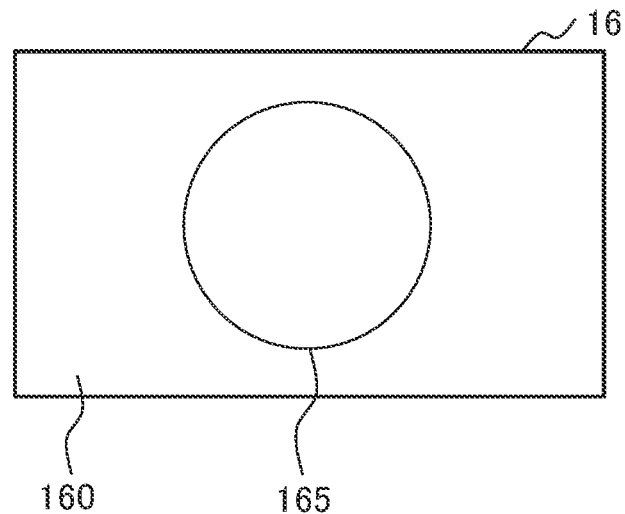
FIG. 5A is a conceptual diagram for describing a lens region formed in a liquid crystal region of a liquid crystal projection lens in Control Example 2 of the projection device according to the first example embodiment.

FIGS. 5A to 7D are conceptual diagrams for describing an example of projection direction control of the liquid crystal projection lens 16 by the control unit 17. FIGS. 5A and 5B are examples in which the lens region 165 is two-dimensionally changed from the position before the change in FIG. 5A to the position after the change in FIG. 5B in the liquid crystal region 160 of the liquid crystal projection lens 16. The examples of FIGS. 5A and 5B are views of the liquid crystal projection lens 16 as seen from the spatial light modulator 13 in the projection direction. In the example of FIGS. 5A and 5B, the lens region 165 is moved upward and leftward from a center portion (a portion surrounded by a broken-line circle) in the liquid crystal region 160 of the liquid crystal projection lens 16. For example, the control unit 17 two-dimensionally changes the lens region 165 by adjusting a formation range of the lens region 165 in the liquid crystal region 160 of the liquid crystal projection lens 16.

Figure 5B:
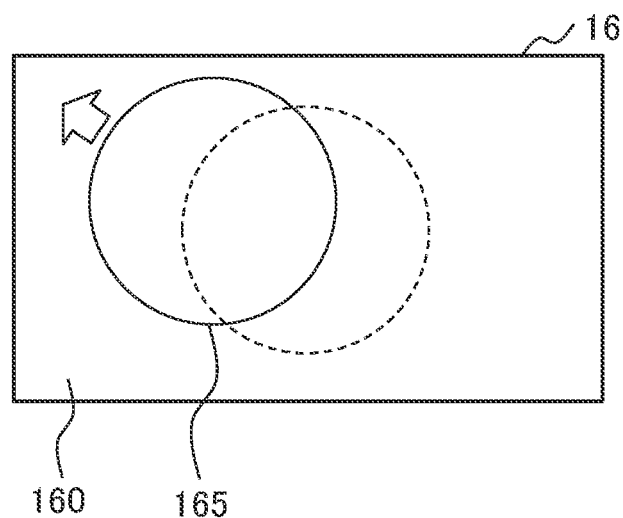
FIG. 5B is a conceptual diagram for describing the lens region formed in the liquid crystal region of the liquid crystal projection lens in Control Example 2 of the projection device according to the first example embodiment.
Figure 6A:
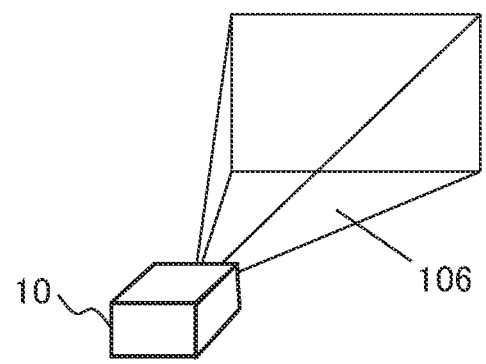
FIG. 6A is a conceptual diagram for describing control of a projection direction of projection light in Control Example 2 of the projection device according to the first example embodiment.
Figure 6B:
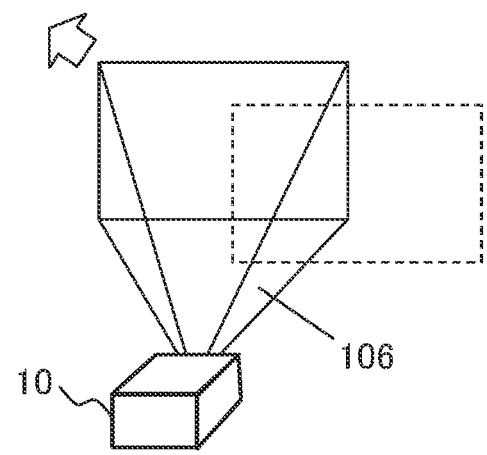
FIG. 6B is a conceptual diagram for describing control of the projection direction of projection light in Control Example 2 of the projection device according to the first example embodiment.

FIGS. 6A and 6B are conceptual diagrams for describing a change in the projection direction of the projection light 106 caused by moving the lens region 165 in the liquid crystal region 160 of the liquid crystal projection lens 16 as illustrated in FIGS. 5A and 5B. The example of FIGS. 6A and 6B presents views of the projection device 10 as seen from the upper viewpoint. In the example of FIGS. 6A and 6B, the projection direction is changed to the upper left side by two-dimensionally changing the lens region 165 from the position before the change in FIG. 6A to the position after the change in FIG. 6B in the liquid crystal region 160 of the liquid crystal projection lens 16.

FIGS. 7A and 7B are conceptual diagrams for describing a change in the projection range 170 of the projection light 106 caused by moving the lens region 165 in the liquid crystal region 160 of the liquid crystal projection lens 16 as illustrated in FIGS. 5A and 5B. FIGS. 7A and 7B illustrate an example in which the projection light is projected forward from an automobile equipped with the projection device 10. The inside of the projection range 170 before the change in FIG. 7A includes the entire automobile traveling ahead. The inside of the projection range 170 after the change in FIG. 7B includes the entire light emitting surface of a traffic signal located in front. For example, in the case of controlling traveling of an automobile on a general road, it is necessary to cause the automobile to travel according to a light emission color of the traffic light. Therefore, when the entire light emitting surface of the traffic light is included in the projection range 170, it is easy to safely control the travel of the automobile.

Third Control Example

Figure 8A:
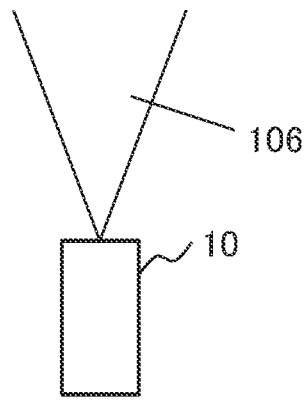
FIG. 8A is a conceptual diagram for describing control of a projection angle of projection light in Control Example 3 of the projection device according to the first example embodiment.

FIGS. 8A to 9B are conceptual diagrams for describing an example of projection angle control of the liquid crystal projection lens 16 by the control unit 17. FIGS. 8A and 8B are examples in which the projection angle is changed from the angle before the change in FIG. 8A to the angle after the change in FIG. 8B in the liquid crystal region 160 of the liquid crystal projection lens 16. For example, the control unit 17 changes the projection angle by adjusting the refractive index of the lens region 165 in the liquid crystal region 160 of the liquid crystal projection lens 16.

Figure 8B:
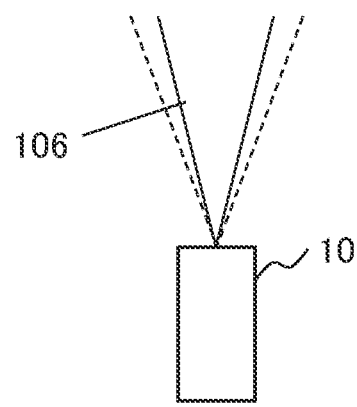
FIG. 8B is a conceptual diagram for describing control of the projection angle of projection light in Control Example 3 of the projection device according to the first example embodiment.
Figure 9A:
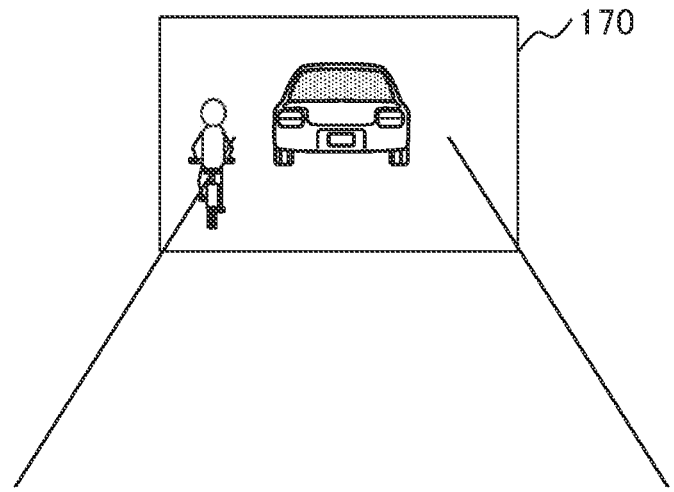
FIG. 9A is a conceptual diagram for describing a projection range of projection light in Control Example 3 of the projection device according to the first example embodiment.
Figure 9B:
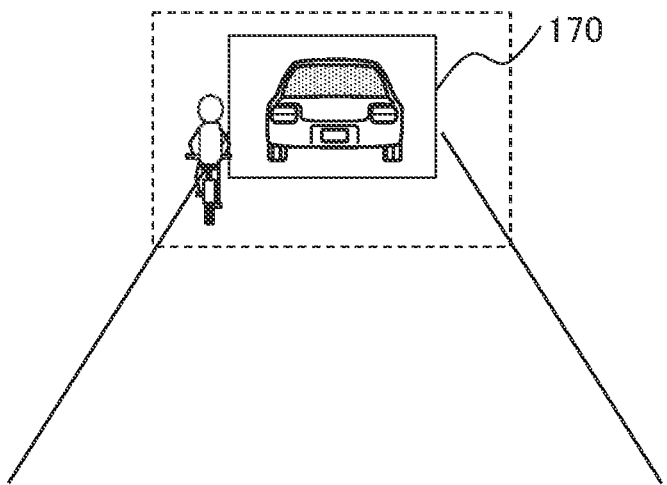
FIG. 9B is a conceptual diagram for describing the projection range of projection light in Control Example 3 of the projection device according to the first example embodiment.

FIGS. 9A and 9B are conceptual diagrams for describing an example in which the projection angle of the projection light 106 is reduced by increasing the refractive index of the lens region 165 in the liquid crystal region 160 of the liquid crystal projection lens 16 as illustrated in FIGS. 8A and 8B. FIGS. 9A and 9B illustrate an example in which the projection light is projected forward from an automobile equipped with the projection device 10. The inside of the projection range 170 before the change in FIG. 9A includes the entire automobile and bicycle traveling ahead. The inside of the projection range 170 after the change in FIG. 9B includes the entire automobile traveling ahead and does not include the bicycle traveling ahead. For example, in the case of spatial optical communication with the automobile located in front of the automobile, the intensity of the spatial optical signal can be increased by narrowing the projection range 170 to only the automobile without including the bicycle in the projection range 170.

Fourth Control Example

Figure 10A:
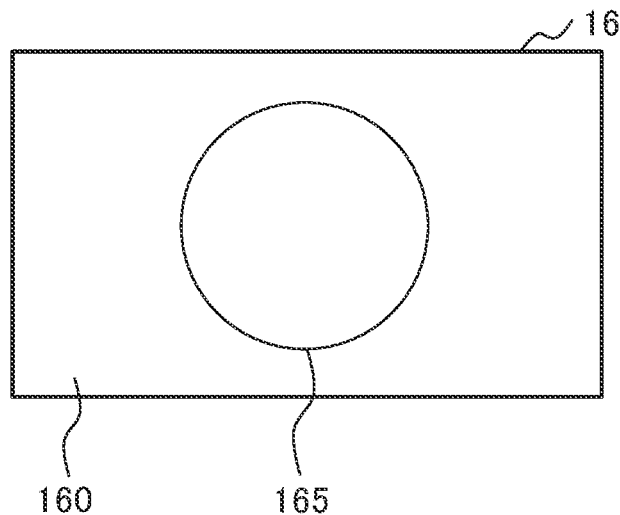
FIG. 10A is a conceptual diagram for describing a lens region formed in a liquid crystal region of a liquid crystal projection lens in Control Example 4 of the projection device according to the first example embodiment.
Figure 10B:
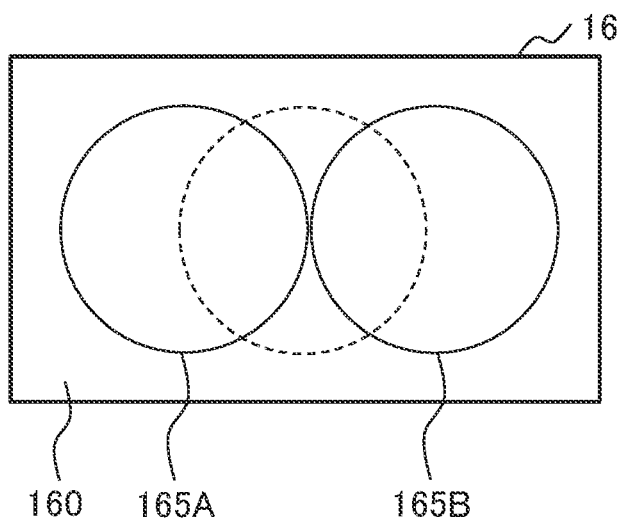
FIG. 10B is a conceptual diagram for describing the lens region formed in the liquid crystal region of the liquid crystal projection lens in Control Example 4 of the projection device according to the first example embodiment.

FIGS. 10A and 10B are conceptual diagrams for describing an example of projection angle control of the liquid crystal projection lens 16 by the control unit 17. FIGS. 10A and 10B illustrate an example in which two lens regions 165 (165A, 165B) after the change in FIG. 10B are formed in place of the lens region 165 before the change in FIG. 10A in the liquid crystal region 160 of the liquid crystal projection lens 16.

FIG. 11 illustrates an example in which two identical lens regions 165 (165A and 165B) are formed in the liquid crystal projection lens 16. In the example of FIG. 11, it is assumed that the modulation part 130 of the spatial light modulator 13 is irradiated with the parallel light 102 from the light source 11. In the example of FIG. 11, the lens region 165A and the lens region 165B having different projection directions and the same refractive index are formed in the liquid crystal region 160 of the liquid crystal projection lens 16. The control unit 17 sets a phase distribution for causing the modulation part 130 of the spatial light modulator 13 to form a single image.

In the example of FIG. 11, the control unit 17 causes the modulation part 130 to emit the parallel light 102 from the light source 11 in a state where the phase distribution for forming a single projected image is set to the modulation part 130. As a result, projection light 106A and projection light 106B that form an image corresponding to the phase distribution set to the modulation part 130 are projected in different projection directions.

Figure 12:
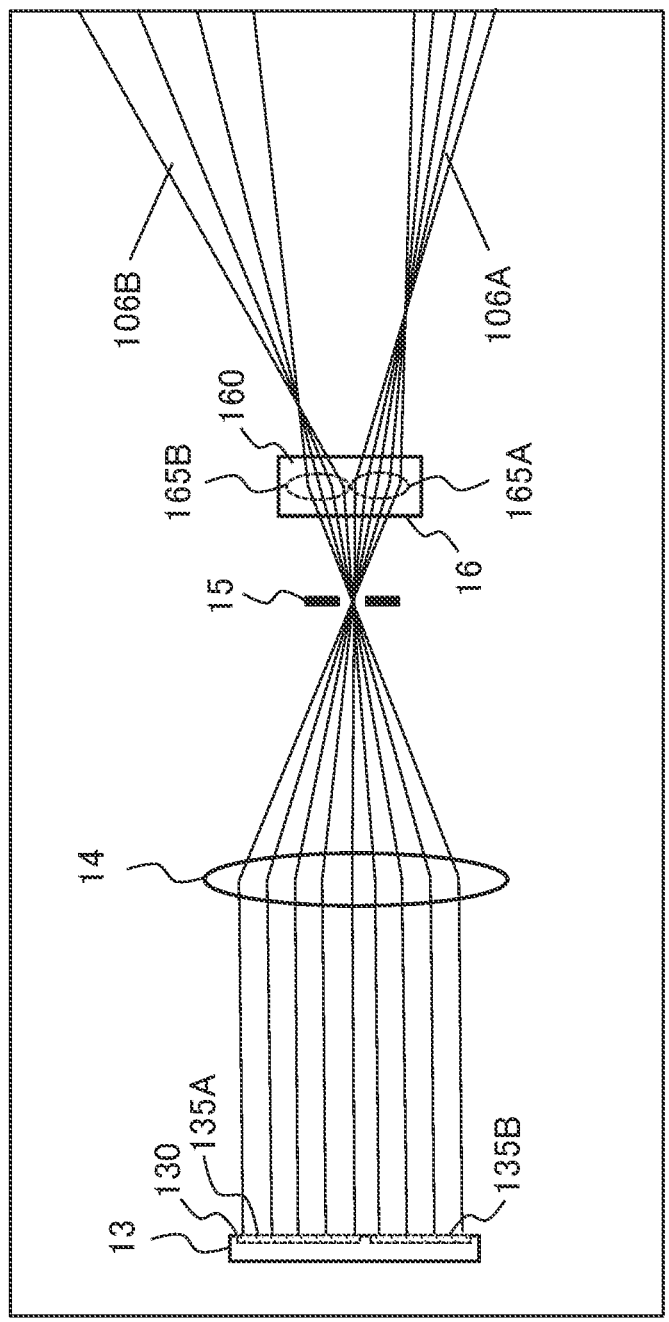
FIG. 12 is a conceptual diagram for describing another example of the optical path in Control Example 4 of the projection device according to the first example embodiment.

FIG. 12 illustrates an example in which the two different lens regions 165 (165A and 165B) are formed in the liquid crystal projection lens 16. In the example of FIG. 12, it is assumed that the modulation part 130 of the spatial light modulator 13 is irradiated with the parallel light 102 from the light source 11. In the example of FIG. 12, the lens region 165A and the lens region 165B different in projection direction and refractive index are formed in the liquid crystal region 160 of the liquid crystal projection lens 16. In the example of FIG. 12, a modulation region 135A corresponding to the lens region 165A and a modulation region 135B corresponding to the lens region 165B are allocated to the modulation part 130 of the spatial light modulator 13. A phase distribution of an image projected using the lens region 165A is set to the modulation region 135A. A phase distribution of an image projected using the lens region 165B is set to the modulation region 135B.

In the example of FIG. 12, the control unit 17 sets phase distributions for forming an image projected using the lens region 165A and the lens region 165B, to the modulation region 135A and modulation region 135B of the modulation part 130. The control unit 17 causes the modulation part 130 to emit the parallel light 102 from the light source 11 in a state where the phase distributions are set to the modulation region 135A and the modulation region 135B. As a result, the projection light 106A that forms an image corresponding to the phase distribution set to the modulation region 135A and the projection light 106B that forms an image corresponding to the phase distribution set to the modulation region 135B are projected. The projection light 106A and the projection light 106B are projected in different projection directions at different projection angles. For example, the light source 11 may include two emitters 111, and may be configured to emit the parallel light 102 based on the laser light 101 from the different emitters 111 to the modulation region 135A and the modulation region 135B. In this configuration, the projection light 106A and the projection light 106B that form different images can be projected in different projection directions. If the light source 11 has two light emitters 111, the parallel light 102 different in intensity can be emitted from the light source 11.

Figure 13A:
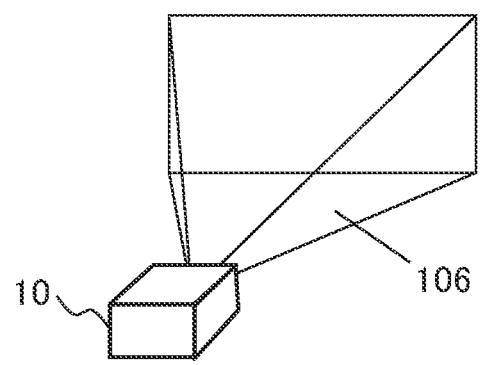
FIG. 13A is a conceptual diagram for describing control of a projection direction and a projection angle of projection light in Control Example 4 of the projection device according to the first example embodiment.
Figure 13B:
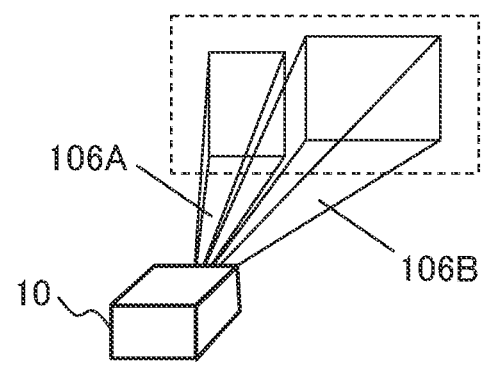
FIG. 13B is a conceptual diagram for describing control of the projection direction and the projection angle of projection light in Control Example 4 of the projection device according to the first example embodiment.

FIGS. 13A and 13B are conceptual diagrams for describing a change in the projection direction and the projection angle of the projection light 106 by forming the lens region 165A and the lens region 165B different in projection direction and refractive index in the liquid crystal region 160 of the liquid crystal projection lens 16. The example of FIGS. 13A and 13B present views of the projection device 10 as seen from the diagonally rearward right side. In the example of FIG. 13B, when the lens region 165A and the lens region 165B are formed in the liquid crystal region 160 of the liquid crystal projection lens 16, the projection light 106A and projection light 106B different in projection direction and projection angle are projected.

Figure 14A:
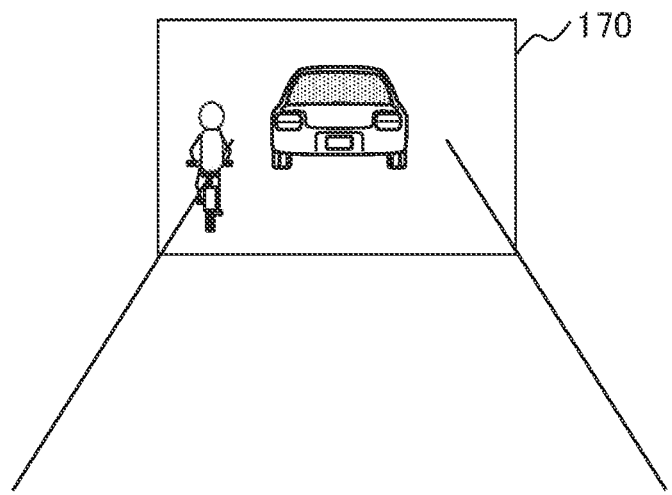
FIG. 14A is a conceptual diagram for describing a projection range of projection light in Control Example 4 of the projection device according to the first example embodiment.
Figure 14B:
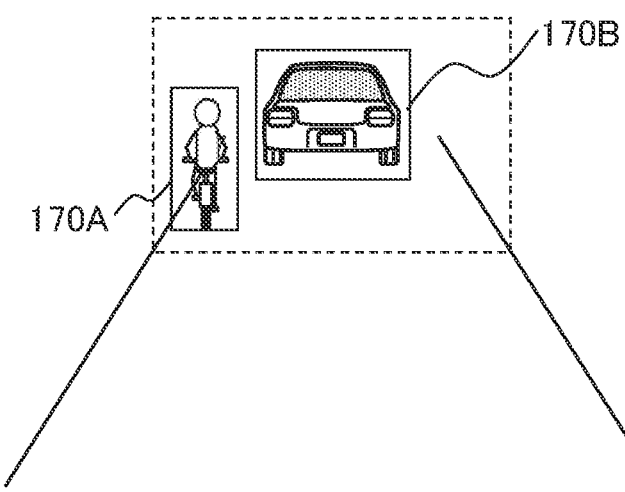
FIG. 14B is a conceptual diagram for describing the projection range of projection light in Control Example 4 of the projection device according to the first example embodiment.

FIGS. 14A and 14B are conceptual diagrams for describing a change in the projection range 170 by forming the lens region 165A and the lens region 165B in the liquid crystal region 160 of the liquid crystal projection lens 16. FIGS. 14A and 14B illustrate an example in which the projection light is projected forward from an automobile equipped with the projection device 10. The inside of the projection range 170 before the change in FIG. 14A includes an automobile and a bicycle traveling ahead. The inside of the projection range 170A after the change in FIG. 14B includes the entire automobile traveling ahead. In addition, the inside of the projection range 170B after the change in FIG. 14B includes the entire bicycle traveling ahead. For example, in the case of controlling traveling of an automobile on a general road, it is necessary to perform different control according to the type and the number of moving bodies traveling ahead. Therefore, it is easier to reliably control the traveling of the automobile when the projection light 106 can be individually projected to the moving objects traveling ahead.

Modification 1

Figure 15:
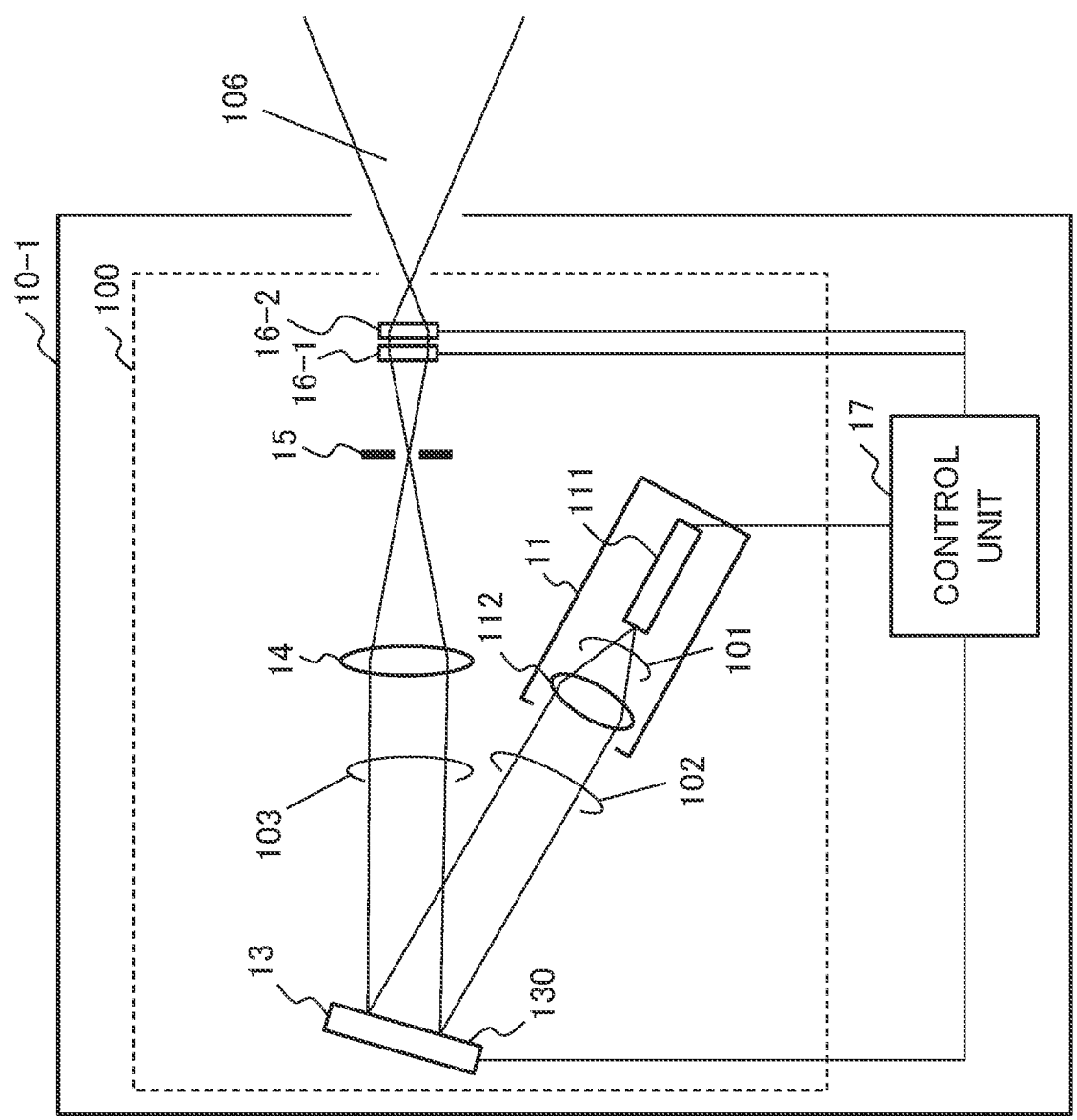
FIG. 15 is a conceptual diagram illustrating an example of a configuration of a projection device according to Modification 1 of the first example embodiment.

FIG. 15 is a conceptual diagram illustrating an example of a configuration of a projection device 10-1 according to Modification 1 of the present example embodiment. The projection device 10-1 includes a light source 11, a spatial light modulator 13, a Fourier transform lens 14, an aperture 15, a first liquid crystal projection lens 16-1, a second liquid crystal projection lens 16-2, and a control unit 17. The light source 11, the spatial light modulator 13, the Fourier transform lens 14, the aperture 15, the first liquid crystal projection lens 16-1, and the second liquid crystal projection lens 16-2 constitute a projection unit 100. The Fourier transform lens 14, the aperture 15, the first liquid crystal projection lens 16-1, and the second liquid crystal projection lens 16-2 constitute a projection optical system. FIG. 15 is a lateral view of an internal configuration of the projection device 10-1. FIG. 15 is a conceptual diagram, and does not accurately represent a positional relationship between components, a traveling direction of light, and the like.

The projection device 10-1 of the present modification (FIG. 15) is different from the projection device 10 in FIG. 1 in including the first liquid crystal projection lens 16-1 and the second liquid crystal projection lens 16-2. The projection device 10-1 of the present modification (FIG. 15) has the same configuration as the projection device 10 in FIG. 1 except for the first liquid crystal projection lens 16-1 and the second liquid crystal projection lens 16-2. FIG. 15 illustrates an example in which two liquid crystal projection lenses 16 are combined, but three or more liquid crystal projection lenses 16 may be combined.

Figure 16:
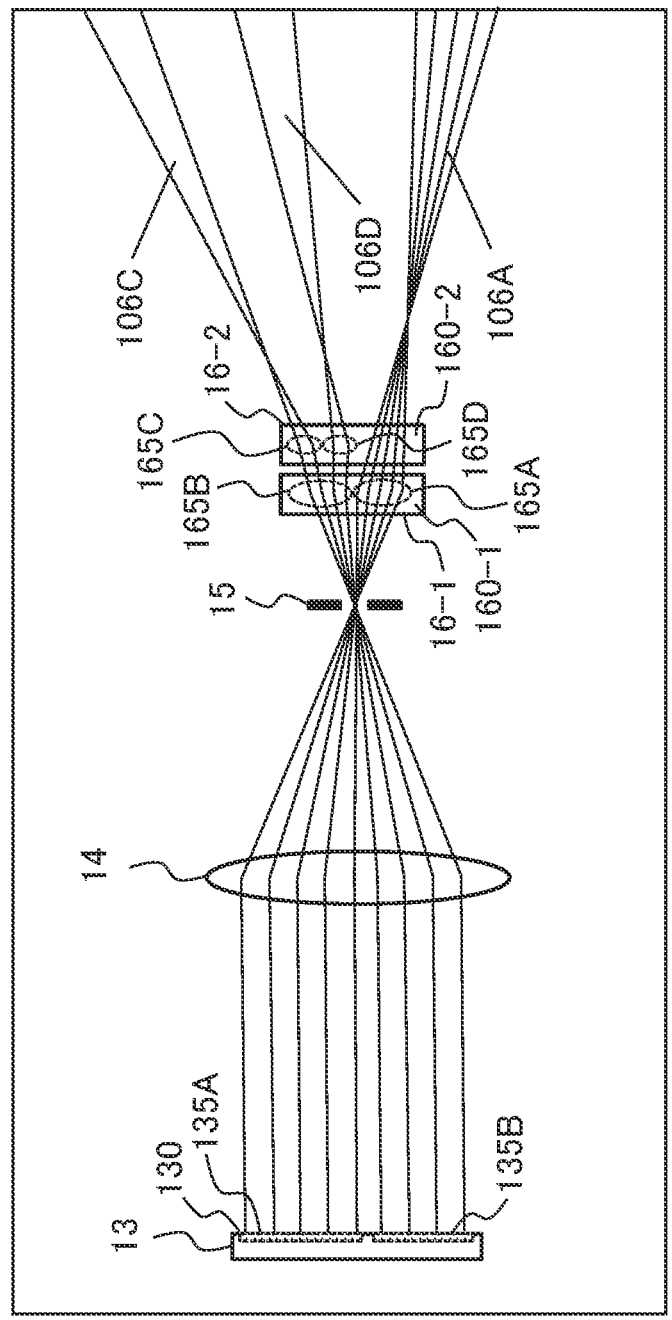
FIG. 16 is a conceptual diagram for describing an example of an optical path in a projection device according to Modification 1 of the first example embodiment.

FIG. 16 is a conceptual diagram illustrating an example in which projection light 106 is projected using the first liquid crystal projection lens 16-1 and the second liquid crystal projection lens 16-2. A lens region 165A and a lens region 165B different in refractive index and projection direction are formed in a liquid crystal region 160-1 of the front first liquid crystal projection lens 16-1. A lens region 165C and a lens region 165D different in refractive index and projection direction are formed in a liquid crystal region 160-2 of the back second liquid crystal projection lens 16-2. The number of the lens regions 165 formed in the first liquid crystal projection lens 16-1 and the second liquid crystal projection lens 16-2 is not particularly limited. For example, the lens region 165 may be formed in one of the first liquid crystal projection lens 16-1 and the second liquid crystal projection lens 16-2, and the lens region 165 may not be formed in the other.

In the example of FIG. 16, it is assumed that the modulation part 130 of the spatial light modulator 13 is irradiated with parallel light 102 from the light source 11. In the example of FIG. 16, the control unit 17 allocates a modulation region 135A corresponding to the lens region 165A and a modulation region 135B corresponding to the lens region 165B to the modulation part 130 of the spatial light modulator 13. A phase distribution of an image projected using the lens region 165A is set to the modulation region 135A. A phase distribution of an image projected using the lens region 165B is set to the modulation region 135B. The control unit 17 causes the modulation part 130 to emit the parallel light 102 from the light source 11 in a state where the phase distributions are set to the modulation region 135A and the modulation region 135B of the modulation part 130.

The light diffracted by the lens region 165A of the first liquid crystal projection lens 16-1 passes through the liquid crystal region 160-2 of the second liquid crystal projection lens 16-2, and is projected as projection light 106A. The light diffracted by the lens region 165B of the first liquid crystal projection lens 16-1 is diffracted by the lens region 165C and the lens region 165D of the second liquid crystal projection lens 16-2, and is projected as projection light 106C and projection light 106D. As a result, the projection light 106A forming an image corresponding to the phase distribution set to the modulation region 135A and the projection light 106C and the projection light 106D forming an image corresponding to the phase distribution set to the modulation region 135B are projected in different projection directions at different projection angles.

In the example of FIG. 16, an image (also referred to as a first image) displayed by the projection light 106A and an image (also referred to as a second image) displayed by the projection light 106C and the projection light 106D are displayed. According to the method of the present modification, projection light for forming a plurality of images can be projected in different projection directions at different projection angles.

As described above, the projection device of the present example embodiment includes the light source, the spatial light modulator, the Fourier transform lens, the aperture, and the liquid crystal projection lens. The light source emits parallel light. The spatial light modulator includes a modulation part that modulates the phase of the parallel light emitted from the light source. The Fourier transform lens performs Fourier transform on the modulated light modulated by the modulation part to form an image. The aperture is arranged in the vicinity of the focal position of the Fourier transform lens. The aperture is a frame that blocks high-order light included in the light focused by the Fourier transform lens and limits an outer edge of the display area. The liquid crystal projection lens (also referred to as a liquid crystal lens) includes a liquid crystal region on which the light focused by the Fourier transform lens is incident. The liquid crystal lens projects the modulated light incident on a lens region dynamically formed in the liquid crystal region as projection light. The control unit forms the lens region at a desired position in the liquid crystal region of the liquid crystal lens. The control unit sets the phase image corresponding to the projection light projected toward the projection target, to the modulation part of the spatial light modulator. The control unit controls the light source so that parallel light is emitted toward the modulation part to which the phase image is set.

According to the present example embodiment, the use of the liquid crystal lens including the liquid crystal region in which the lens region is formed at an arbitrary position as the projection lens makes it possible to project a high definition image in an arbitrary projection direction.

In one aspect of the present example embodiment, the control unit controls the projection direction of the projection light by two-dimensionally moving the position where the lens region is formed in the liquid crystal region of the liquid crystal projection lens. According to the present aspect, the projection direction of the projection light can be controlled by changing the position of the lens region in the liquid crystal region of the liquid crystal projection lens.

In one aspect of the present example embodiment, the control unit controls the projection angle of the projection light by adjusting the refractive index of the lens region formed in the liquid crystal region of the liquid crystal projection lens. According to the present aspect, the projection angle of the projection light can be controlled by changing the refractive index of the lens region in the liquid crystal region of the liquid crystal projection lens.

In one aspect of the present example embodiment, the control unit forms a plurality of lens regions in the liquid crystal region of the liquid crystal projection lens. According to the present aspect, projection light can be projected in a plurality of projection directions by forming a plurality of lens regions in the liquid crystal region of the liquid crystal projection lens.

In one aspect of the present example embodiment, the control unit forms a plurality of lens regions different in at least one of a projection direction and a projection angle of projection light, in the liquid crystal region of the liquid crystal lens. The control unit individually sets a plurality of phase images corresponding to projection light projected toward different projection targets, in association with a plurality of lens regions, in a plurality of modulation regions set to the modulation part of the spatial light modulator. The control unit controls the light source in such a way as to emit parallel light toward the modulation part in which different phase images are set in the plurality of modulation regions. According to the present aspect, setting the plurality of phase images corresponding to the projection light projected toward the different projection targets in the modulation part of the spatial light modulator makes it possible to project the different projection light toward the plurality of projection targets.

Second Example Embodiment

Next, a projection device according to a second example embodiment will be described with reference to the drawings. The projection device of the present example embodiment includes an imaging unit that images projection light in a projection direction. The projection device according to the present example embodiment projects projection light based on the image in the projection direction captured by the imaging unit.

(Configuration)

Figure 17:
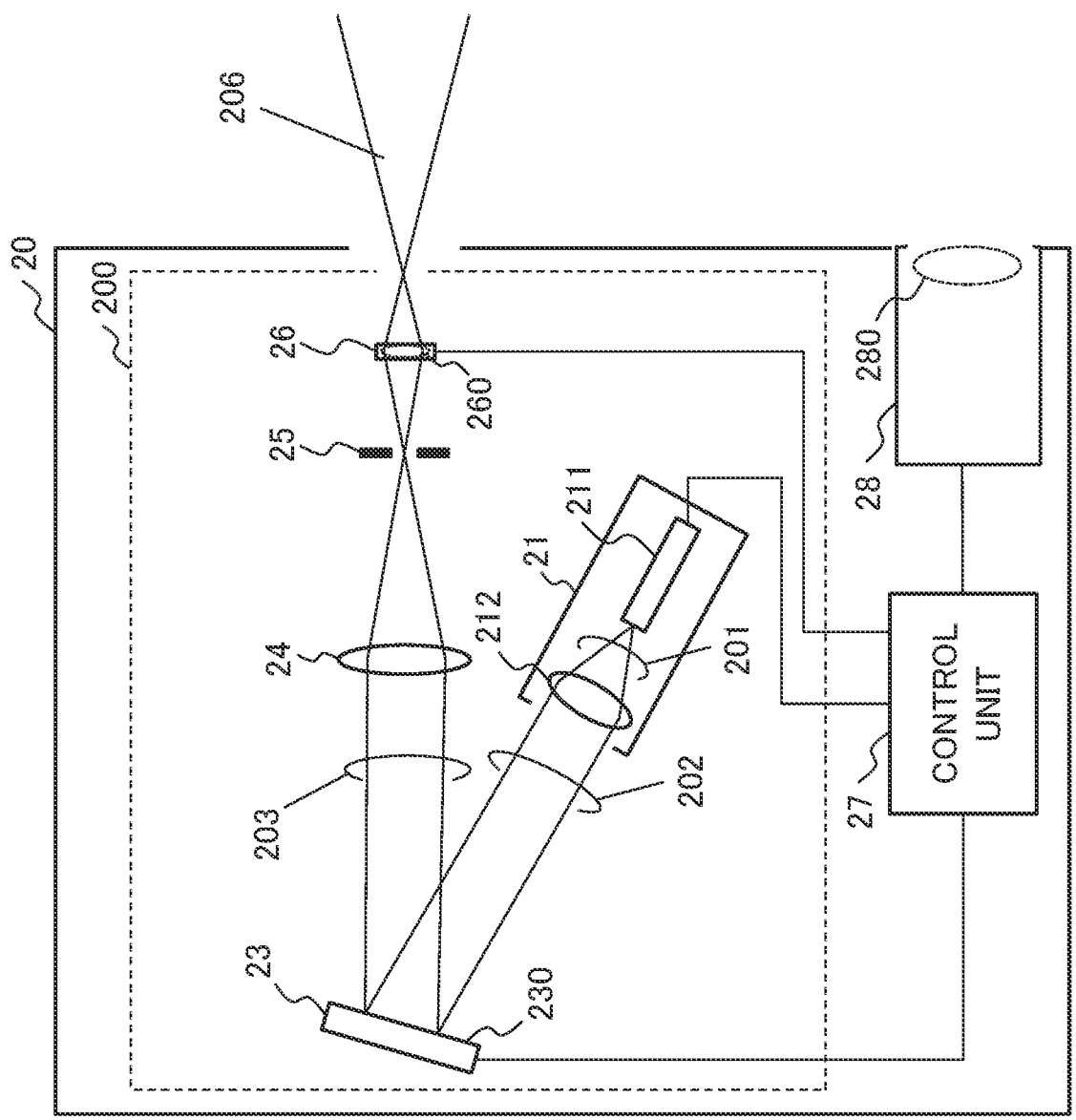
FIG. 17 is a conceptual diagram illustrating an example of a configuration of a projection device according to a second example embodiment.

FIG. 17 is a conceptual diagram illustrating an example of a configuration of a projection device 20 of the present example embodiment. The projection device 20 includes a light source 21, a spatial light modulator 23, a Fourier transform lens 24, an aperture 25, a liquid crystal projection lens 26, a control unit 27, and an imaging unit 28. The light source 21, the spatial light modulator 23, the Fourier transform lens 24, the aperture 25, and the liquid crystal projection lens 26 constitute a projection unit 200. The Fourier transform lens 24, the aperture 25, and the liquid crystal projection lens 26 constitute a projection optical system. FIG. 17 is a lateral view of an internal configuration of the projection device 20. FIG. 17 is a conceptual diagram, and does not accurately represent a positional relationship between components, a traveling direction of light, and the like.

The light source 21 includes an emitter 211 and a collimator 212. The emitter 211 emits laser light 201 in a predetermined wavelength band under the control of the control unit 27. The collimator 212 converts the laser light 201 emitted from the emitter 211 into parallel light 202. The emitter 211 has the same configuration as the emitter 111 of the first example embodiment. The collimator 212 has the same configuration as the collimator 112 of the first example embodiment. The laser light 201 emitted from the emitter 211 is converted into the parallel light 202 by the collimator 212, and is emitted from the light source 21. The parallel light 202 emitted from the light source 21 travels toward a modulation part 230 of the spatial light modulator 23.

The spatial light modulator 23 includes a modulation part 230 irradiated with the parallel light 202. In the modulation part 230 of the spatial light modulator 23, a pattern (also referred to as a phase image) corresponding to the image displayed by projection light 206 is set under the control of the control unit 27. The spatial light modulator 23 has the same configuration as the spatial light modulator 13 of the first example embodiment. Modulated light 203 modulated by the modulation part 230 of the spatial light modulator 23 travels toward the incidence surface of the Fourier transform lens 24.

The Fourier transform lens 24 is an optical lens that forms an image generated by projecting the modulated light 203 modulated by the spatial light modulator 23 at infinity, at a focal position near the aperture 25. The Fourier transform lens 24 has the same configuration as the Fourier transform lens 14 of the first example embodiment. Instead of the Fourier transform lens 24, a virtual lens may be used. When the virtual lens is used, the Fourier transform lens 24 can be omitted. The light condensed by the Fourier transform lens 24 travels toward the aperture 25.

The aperture 25 is a frame that blocks high-order light included in the light focused by the Fourier transform lens 24 and limits an outer edge of the display area. The aperture 25 has the same configuration as the aperture 15 of the first example embodiment. The light having passed through the opening of the aperture 25 is incident on the liquid crystal projection lens 26.

The liquid crystal projection lens 26 (also referred to as a liquid crystal lens) is an optical lens that enlarges the light focused by the Fourier transform lens 24 in accordance with a displayed image. The liquid crystal projection lens 26 has the same configuration as the liquid crystal projection lens 16 of the first example embodiment. The liquid crystal projection lens 26 may be formed of a single lens or a lens in which a plurality of lenses is combined.

The control unit 27 controls the light source 21, the spatial light modulator 23, the liquid crystal projection lens 26, and the imaging unit 28. The control unit 27 is implemented by a microcomputer including a processor and a memory. The control unit 27 has the same configuration as the control unit 17 of the first example embodiment except for controlling the imaging unit 28.

The control unit 27 causes the imaging unit 28 to image the projection light 206 in the projection direction. The control unit 27 sets the projection direction and projection angle of the projection light 206 based on image data captured by the imaging unit 28. The control unit 27 sets a phase image corresponding to the projected image to the modulation part 230. The control unit 27 drives the spatial light modulator 23 in such a way as to change a parameter that determines a difference between a phase of the parallel light 202 emitted to the modulation part 230 of the spatial light modulator 23 and a phase of the modulated light 203 reflected by the modulation part 230. The control unit 27 forms a lens region for projecting the projection light 206 in the liquid crystal region 260 of the liquid crystal projection lens 26.

The control unit 27 drives the emitter 211 of the light source 21 in a state where the phase image corresponding to the image to be displayed is set to the modulation part 230. As a result, the parallel light 202 emitted from the light source 21 is emitted to the modulation part 230 of the spatial light modulator 23 along with a timing of setting the phase image to the modulation part 230 of the spatial light modulator 23. The parallel light 202 emitted to the modulation part 230 of the spatial light modulator 23 is modulated by the modulation part 230 of the spatial light modulator 23. The modulated light 203 modulated by the modulation part 230 of the spatial light modulator 23 is projected from the liquid crystal projection lens 26, as the projection light 206 corresponding to the phase image set to the modulation part 230 of the spatial light modulator 23.

The imaging unit 28 images the projection light 206 in the projection direction under the control of the control unit 27. The imaging unit 28 has a function of a digital camera. The imaging unit 28 includes a lens 280 for imaging the projection light 206 in the projection direction. The imaging unit 28 is arranged such that the lens 280 is oriented in the imaging direction. The imaging unit 28 outputs the image data captured under the control of the control unit 27 to the control unit 27. For example, the imaging unit 28 may output the image data captured under the control of the control unit 27 to an external system (not illustrated). The image data captured by the imaging unit 28 can be used for any purpose.

[Imaging Unit]

Figure 18:
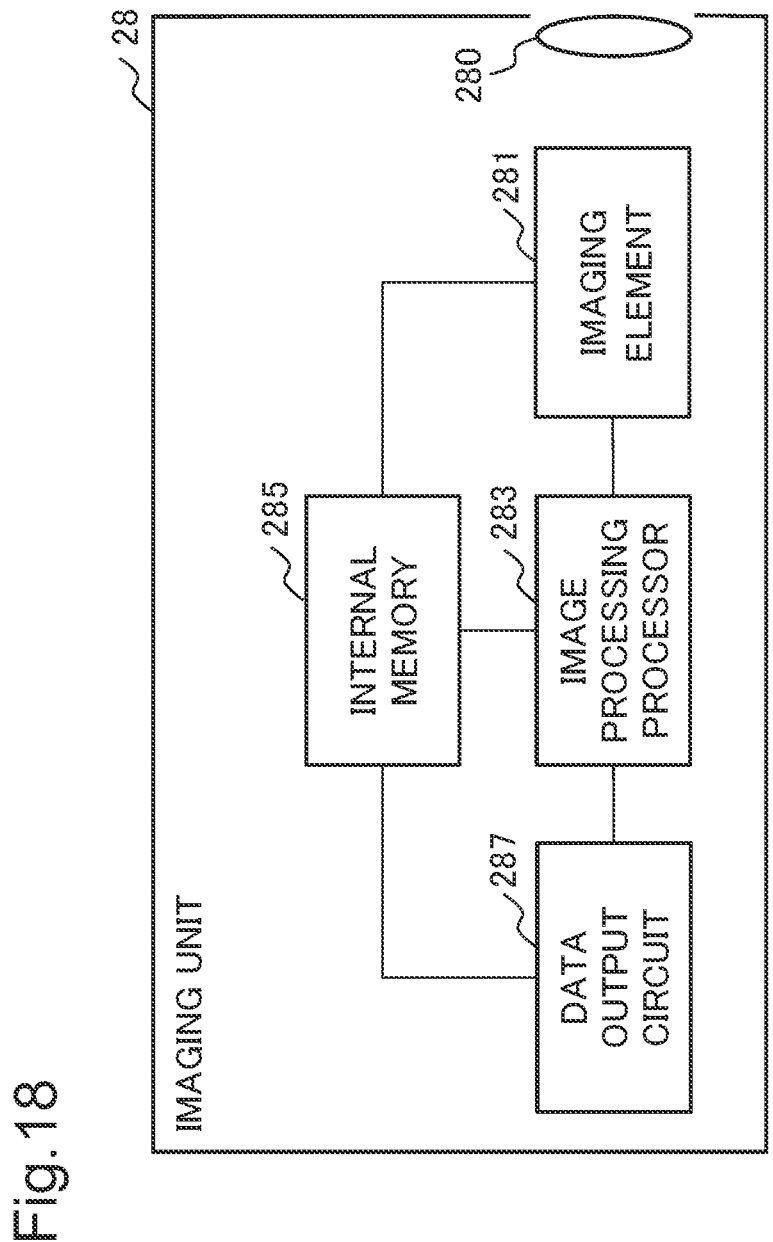
FIG. 18 is a conceptual diagram illustrating an example of a configuration of an imaging unit of the projection device according to the second example embodiment.

FIG. 18 is a conceptual diagram illustrating an example of a configuration of the imaging unit 28. The imaging unit 28 includes the lens 280, an imaging element 281, an image processing processor 283, an internal memory 285, and a data output circuit 287.

The lens 280 is an optical element for imaging the projection light 206 in the projection direction. The lens 280 can be made of a material such as glass or plastic. For example, the lens 280 is made of a material such as quartz. The material of the lens 280 is not particularly limited.

The imaging element 281 is an element for imaging the projection light 206 in the projection direction and imaging the projection range formed in the projection direction. The imaging element 281 is a photoelectric conversion element in which semiconductor components are integrated. The imaging element 281 can be implemented by a solid-state imaging element such as a charge-coupled device (CCD) or a complementary metal-oxide-semiconductor (CMOS), for example. The imaging element 281 has a number of pixels that are capable of detecting an object in the projection range of the projection light 206. The imaging element 281 usually images light in a visible region. The imaging element 281 may include an element capable of imaging infrared rays, ultraviolet rays, or the like.

The image processing processor 283 is an integrated circuit that executes image processing on the imaging data captured by the imaging element 281 and converts the imaging data into image data. For example, the image processing processor 283 executes image processing such as dark current correction, interpolation operation, color space conversion, gamma correction, aberration correction, noise reduction, and image compression. If the image information is not to be processed, the image processing processor 283 may be omitted.

The internal memory 285 is a storage element that temporarily stores image information that cannot be processed by the image processing processor 283 or processed image information. The internal memory 285 may be configured to temporarily store image information captured by the imaging element 281. The internal memory 285 may be formed by a general memory.

The data output circuit 287 outputs the image data processed by the image processing processor 283 to the control unit 27. The image data output to the control unit 27 is used for detecting an object in the projection range of the projection light 206, for example.

Application Example 1

Figure 19:
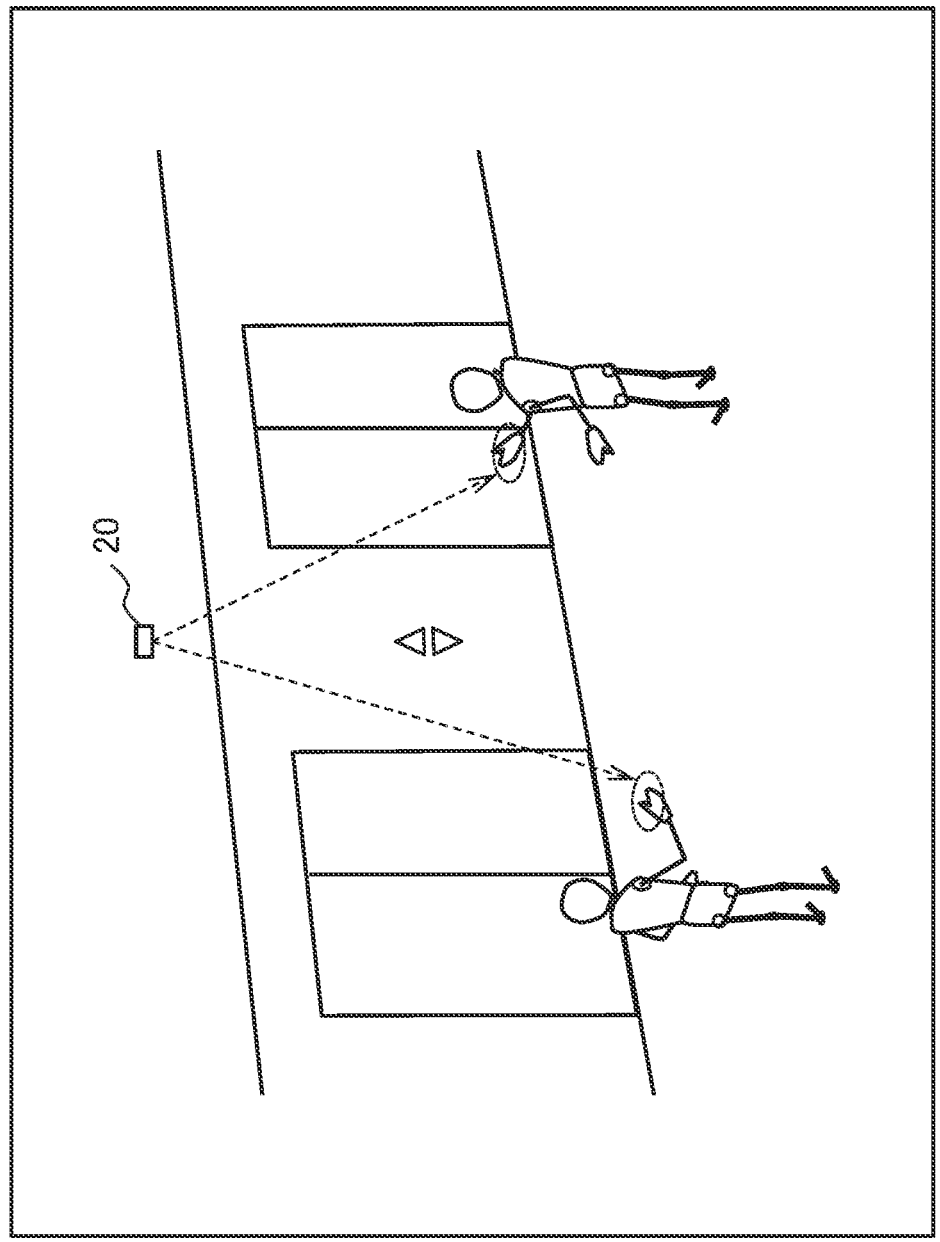
FIG. 19 is a conceptual diagram for describing Application Example 1 of the projection device according to the second example embodiment.

FIG. 19 is a conceptual diagram for describing Application Example 1 of the present example embodiment. In the present application example, the projection device 20 is arranged on the ceiling in the vicinity of the door of an elevator. For example, the projection device 20 captures an image in an imaging range in front of the door of the elevator. The projection device 20 detects a hand of a person from the image in the imaging range. The projection device 20 projects a candidate image of the destination floor of the elevator toward the detected hand of the person. The projection device 20 outputs the image of the hand of the person on which the destination floor of the elevator is displayed to a control system (not illustrated) of the elevator. The control system of the elevator identifies the selected destination floor based on the image transmitted from the projection device 20, and controls the elevator. For example, the projection device 20 may be configured to change the color of the projection light 106 by changing the emitter 211 included in the light source 21. For example, the color of the projection light 106 may be changed according to the situation, such as displaying an image of a numerical string for selecting the floor with green projection light and displaying an image of the selected floor number with red projection light.

According to the present application example, it is possible to achieve a system for operating an elevator without touching operation buttons. The method of the present application example can be applied not only to the operation of an elevator but also to opening and closing of an automatic door, input of a passcode to an automatic teller machine (ATM), and the like.

As described above, the projection device of the present example embodiment includes the light source, the spatial light modulator, the Fourier transform lens, the aperture, the imaging unit, and the liquid crystal projection lens. The light source emits parallel light. The spatial light modulator includes a modulation part that modulates the phase of the parallel light emitted from the light source. The Fourier transform lens performs Fourier transform on the modulated light modulated by the modulation part to form an image. The aperture is arranged in the vicinity of the focal position of the Fourier transform lens. The aperture is a frame that blocks high-order light included in the light focused by the Fourier transform lens and limits an outer edge of the display area. The liquid crystal projection lens (also referred to as a liquid crystal lens) includes a liquid crystal region on which the light focused by the Fourier transform lens is incident. The liquid crystal lens projects the modulated light incident on a lens region dynamically formed in the liquid crystal region as projection light. The imaging unit images projection light in the projection direction. The control unit forms the lens region at a desired position in the liquid crystal region of the liquid crystal lens. The control unit sets the phase image corresponding to the projection light projected toward the projection target, to the modulation part of the spatial light modulator. The control unit controls the light source so that parallel light is emitted toward the modulation part to which the phase image is set. The control unit controls at least one of the projection direction and the projection angle of projection light according to the position of a projection target included in an image captured by the imaging unit.

According to the present example embodiment, it is possible to project a high-definition image according to the position of a projection target included in an image captured by the imaging unit, by controlling the projection direction or the projection angle of the projection light according to the position of the projection target.

Third Example Embodiment

Next, a projection device according to a third example embodiment will be described with reference to the drawings. The projection device of the present example embodiment includes a light receiving element that receives light coming from a projection direction of projection light. The projection device of the present example embodiment may include the imaging unit of the second example embodiment.

(Configuration)

Figure 20:
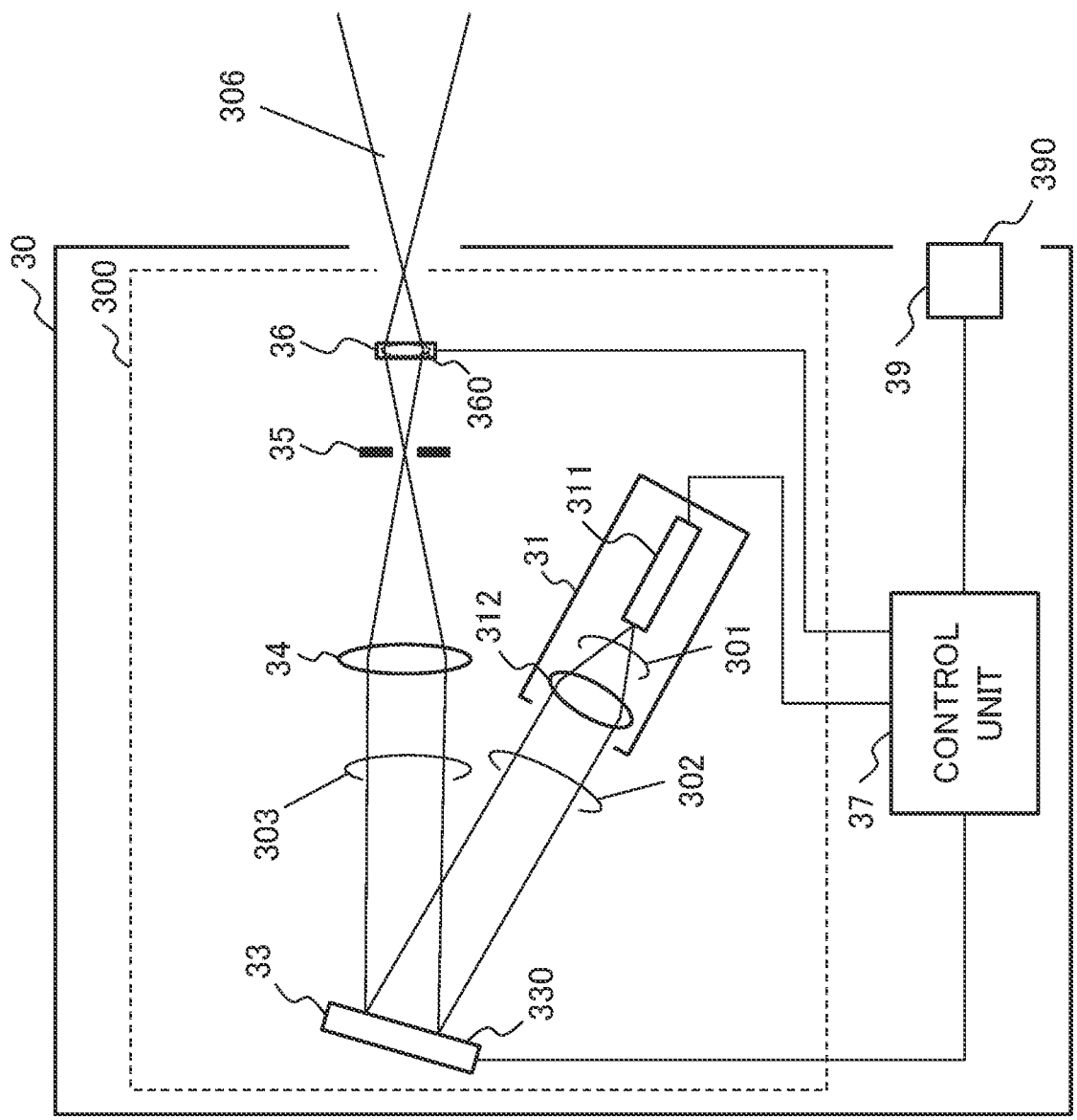
FIG. 20 is a conceptual diagram illustrating an example of a configuration of a projection device according to a third example embodiment.

FIG. 20 is a conceptual diagram illustrating an example of a configuration of a projection device 30 of the present example embodiment. The projection device 30 includes a light source 31, a spatial light modulator 33, a Fourier transform lens 34, an aperture 35, a liquid crystal projection lens 36, a control unit 37, and a light receiving element 39. The light source 31, the spatial light modulator 33, the Fourier transform lens 34, the aperture 35, and the liquid crystal projection lens 36 constitute a projection unit 300. The Fourier transform lens 34, the aperture 35, and the liquid crystal projection lens 36 constitute a projection optical system. The projection device 30 may include a plurality of light receiving elements 39. FIG. 20 is a lateral view of an internal configuration of the projection device 30. FIG. 20 is a conceptual diagram, and does not accurately represent a positional relationship between components, a traveling direction of light, and the like.

The light source 31 includes an emitter 311 and a collimator 312. The emitter 311 emits laser light 301 in a predetermined wavelength band under the control of the control unit 37. The collimator 312 converts the laser light 301 emitted from the emitter 311 into parallel light 302. The emitter 311 has the same configuration as the emitter 111 of the first example embodiment. The collimator 312 has the same configuration as the collimator 112 of the first example embodiment. The laser light 301 emitted from the emitter 311 is converted into the parallel light 302 by the collimator 312, and is emitted from the light source 31. The parallel light 302 emitted from the light source 31 travels toward the modulation part 330 of the spatial light modulator 33.

The spatial light modulator 33 includes a modulation part 330 irradiated with the parallel light 302. In the modulation part 330 of the spatial light modulator 33, a pattern (also referred to as a phase image) corresponding to the image displayed by projection light 306 is set under the control of the control unit 37. The spatial light modulator 33 has the same configuration as the spatial light modulator 13 of the first example embodiment. The modulated light 303 modulated by the modulation part 330 of the spatial light modulator 33 travels toward the incidence surface of the Fourier transform lens 34.

The Fourier transform lens 34 is an optical lens that forms an image generated by projecting the modulated light 303 modulated by the spatial light modulator 33 at infinity, at a focal position near the aperture 35. The Fourier transform lens 34 has the same configuration as the Fourier transform lens 14 of the first example embodiment. Instead of the Fourier transform lens 34, a virtual lens may be used. When the virtual lens is used, the Fourier transform lens 34 can be omitted. The light condensed by the Fourier transform lens 34 travels toward the aperture 35.

The aperture 35 is a frame that blocks high-order light included in the light focused by the Fourier transform lens 34 and limits an outer edge of the display area. The aperture 35 has the same configuration as the aperture 15 of the first example embodiment. The light having passed through the opening of the aperture 35 is incident on the liquid crystal projection lens 36.

The liquid crystal projection lens 36 (also referred to as a liquid crystal lens) is an optical lens that enlarges the light focused by the Fourier transform lens 34 in accordance with a displayed image. The liquid crystal projection lens 36 has the same configuration as the liquid crystal projection lens 16 of the first example embodiment. The liquid crystal projection lens 36 may be formed of a single lens or a lens in which a plurality of lenses is combined.

The control unit 37 controls the light source 31, the spatial light modulator 33, the liquid crystal projection lens 36, and the imaging unit 38. The control unit 37 is implemented by a microcomputer including a processor and a memory. The control unit 37 has the same configuration as the control unit 17 of the first example embodiment except in receiving the optical signal received by the light receiving element 39.

The control unit 37 sets the projection direction and projection angle of the projection light 306. The control unit 37 sets a phase image corresponding to the projected image to the modulation part 330. The control unit 37 drives the spatial light modulator 33 in such a way as to change a parameter that determines a difference between a phase of the parallel light 302 emitted to the modulation part 330 of the spatial light modulator 33 and a phase of the modulated light 303 reflected by the modulation part 330. The control unit 37 forms a lens region for projecting the projection light 306 in the liquid crystal region 360 of the liquid crystal projection lens 36.

The control unit 37 drives the emitter 311 of the light source 31 in a state where the phase image corresponding to the image to be displayed is set to the modulation part 330. As a result, the parallel light 302 emitted from the light source 31 is emitted to the modulation part 330 of the spatial light modulator 33 along with a timing of setting the phase image to the modulation part 330 of the spatial light modulator 33. The parallel light 302 emitted to the modulation part 330 of the spatial light modulator 33 is modulated by the modulation part 330 of the spatial light modulator 33. The modulated light 303 modulated by the modulation part 330 of the spatial light modulator 33 is projected from the liquid crystal projection lens 36, as the projection light 306 corresponding to the phase image set to the modulation part 330 of the spatial light modulator 33.

The control unit 37 receives a signal based on the light received by the light receiving element 39. For example, the control unit 37 sets the projection direction and the projection angle of the projection light 306 according to a signal based on the light received by the light receiving element 39. For example, the control unit 37 measures the distance to an object by using a signal based on the light received by the light receiving element 39. For example, when a spatial light signal is received by the light receiving element 39, the control unit 37 decodes the spatial light signal received by the light receiving element 39. For example, the control unit 37 outputs the decoded signal to another system or device (not illustrated).

The light receiving element 39 includes a light receiving unit 390 that receives light. The light receiving unit 390 of the light receiving element 39 is oriented to a communication target or a distance measurement target object. For example, the light receiving unit 390 of the light receiving element 39 is oriented in the same direction as the projection direction of the projection light 306.

The light receiving element 39 receives light in a wavelength band to be received. For example, the light receiving element 39 receives light in a visible region. For example, the light receiving element 39 receives light in an infrared region. The light receiving element 39 receives light having a wavelength in a 1.5-μm (micrometer) band, for example. The wavelength band of the light received by the light receiving element 39 is not limited to the 1.5-μm band. The wavelength band of the light received by the light receiving element 39 can be arbitrarily set in accordance with the wavelength of the light to be received. The wavelength band of the light received by the light receiving element 39 may be set to a 0.8-μm band, a 1.55-μm band, or a 2.2-μm band, for example. The wavelength band of the light received by the light receiving element 39 may be a 0.8- to 1-μm band, for example. When the wavelength band of light is short, absorption by moisture in the atmosphere is small, which is advantageous for light reception during rainfall. The light receiving element 39 cannot read light when saturated with intense sunlight. Therefore, a color filter that selectively lets the light of the wavelength band of the light to be received pass may be placed at the stage preceding to the light receiving element 39.

The light receiving element 39 converts the received light into an electric signal. For example, the light receiving element 39 can be implemented by an element such as a photodiode or a phototransistor. For example, the light receiving element 39 is implemented by an avalanche photodiode. The light receiving element 39 implemented by the avalanche photodiode can support high-speed communication. The light receiving element 39 may be implemented by an element other than a photodiode, a phototransistor, or an avalanche photodiode as long as it can convert light into an electrical signal.

In order to improve the communication speed, the light receiving unit 390 of the light receiving element 39 is preferably as small as possible. For example, the light receiving unit 390 of the light receiving element 39 has a light receiving area having a diameter of about 0.1 to 0.3 mm (millimeter). In order to improve the light receiving efficiency of the light to be received, a condenser lens that condenses light may be provided in the light receiving unit 390. For example, the condenser lens is preferably configured to efficiently guide light coming from an arbitrary direction to the light receiving unit 390 of the light receiving element 39.

For example, the control unit 37 measures the distance to the projection target according to the time taken for the light projected from the projection device 30 to be reflected by the projection target and return. For example, if the imaging unit 28 of the second example embodiment is provided in the projection device 30, the control unit 37 may measure the distance to the projection target based on the image data captured by the imaging unit 28 on the principle of triangulation. The distance between the projection device 30 and the projection target may be measured by an external system (not illustrated).

Modification 2

Modification 2 of the present example embodiment will be described with reference to the drawings. The present modification is an example including a plurality of light sources 31. Hereinafter, an example in which two light sources 31 are included will be described. Three or more light sources 31 may be included. The projection device of the first example embodiment and the projection device 20 of the second example embodiment may also include a plurality of light sources as in the present modification.

FIG. 21 is a conceptual diagram illustrating an example in which parallel light 302A and parallel light 302B respectively emitted from a light source 31A and a light source 31B are applied to a modulation part 330 of a spatial light modulator 33. FIG. 21 is a view of the direction of the modulation part 330 of the spatial light modulator 33 as seen from the diagonally rearward left side of the light source 31A and the light source 31B. The light source 31A and the light source 31B may emit the parallel light 302A and the parallel light 302B in the same wavelength band, or may emit the parallel light 302A and the parallel light 302B in different wavelength bands. The intensities of the parallel light 302A and parallel light 302B emitted from the light source 31A and the light source 31B can be adjusted independently.

A modulation region 335A and a modulation region 335B are set to the modulation part 330 of the spatial light modulator 33. The parallel light 302A emitted from the light source 31A is applied to the modulation region 335A of the modulation part 330 of the spatial light modulator 33. The parallel light 302A applied to the modulation region 335A is modulated in the modulation region 335A. The parallel light 302B emitted from the light source 31B is applied to the modulation region 335B of the modulation part 330 of the spatial light modulator 33. The parallel light 302B applied to the modulation region 335B is modulated in the modulation region 335B.

FIG. 22 is a conceptual diagram for describing optical paths of modulated light 303A and modulated light 303B modulated in the modulation region 335A and the modulation region 335B, respectively. FIG. 22 is a view of the spatial light modulator 33, the Fourier transform lens 34, the aperture 35, and the liquid crystal projection lens 36 as seen from above. The positional relationship among and the optical path in the spatial light modulator 33, a Fourier transform lens 34, an aperture 35, and a liquid crystal projection lens 36 in FIG. 22 are conceptual, and do not accurately represent the actual positional relationship and the optical path.

The modulated light 303A modulated in the modulation region 335A and the modulated light 303B modulated in the modulation region 335B are condensed by the Fourier transform lens 34, pass through the opening of the aperture 35, and reach the liquid crystal projection lens 36. A liquid crystal region 360 of the liquid crystal projection lens 36 has a lens region 365A corresponding to the modulation region 335A and a lens region 365B corresponding to the modulation region 335B. The modulated light 303A is enlarged in the lens region 365A and projected as projection light 306A. The modulated light 303B is enlarged in the lens region 365B and projected as projection light 306B. For example, the projection light 306A and the projection light 306B are projected in different projection directions. For example, the projection light 306A and the projection light 306B are projected at different projection angles. For example, the projection light 306A and the projection light 306B are projected in different projection directions at different projection angles. The projection light 306A and the projection light 306B may be projected in the same projection direction at the same projection angle.

According to the present modification, the parallel light 302 can be emitted from the plurality of light sources 31 at different timings. According to the present modification, it is possible to project the projection light 306 for displaying different images by setting the phase distributions for forming different images to the modulation region 335A and modulation region 335B. For example, the projection light 306A based on the phase distribution set to the modulation region 335A can be allocated to communication, and the projection light 306A based on the phase distribution set to the modulation region 335B can be allocated to distance measurement. For example, the projection light 306A based on the phase distribution set to the modulation region 335A can be allocated to communication with a certain communication target, and the projection light 306A based on the phase distribution set to the modulation region 335B can be allocated to communication with another communication target.

Application Example 2

Figure 23A:
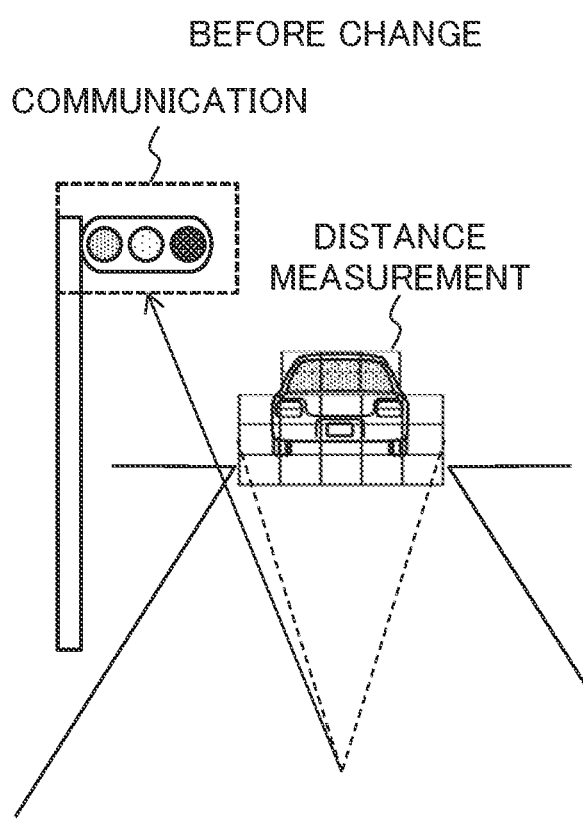
FIG. 23A is a conceptual diagram for describing Application Example 2 of the projection device according to the third example embodiment.
Figure 23B:
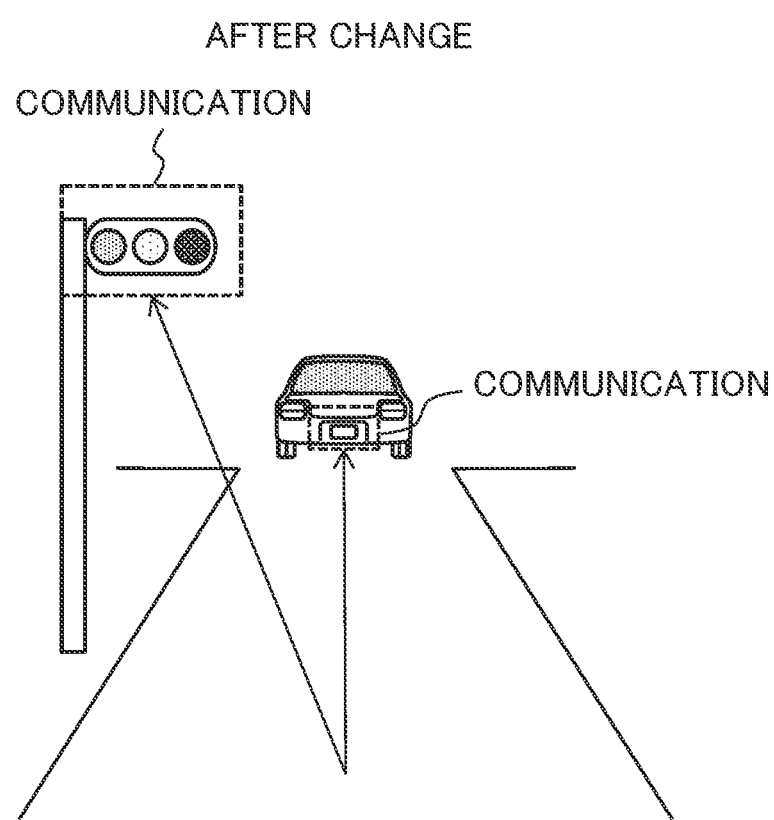
FIG. 23B is a conceptual diagram for describing Application Example 2 of the projection device according to the third example embodiment.

FIGS. 23A and 23B are conceptual diagrams for describing Application Example 2 of the present example embodiment. In the example of FIGS. 23A and 23B, projection light according to the use purpose is projected forward from the automobile equipped with the projection device 30 of the present example embodiment. In the present application example, it is assumed that the light source 31 can switch between the modulation schemes of the emitted parallel light. For example, the control unit 37 switches between the modulation schemes of the parallel light emitted from the light source 31 in accordance with use purposes such as communication and distance measurement.

Before the change in FIG. 23A, projection light for communication is projected toward a light emitting surface of a traffic light located in front, and projection light for distance measurement is projected to an automobile traveling in front. After the change in FIG. 23B, the projection light for communication is projected toward the light emitting surface of the traffic light located in front, and the projection light for communication is also projected to the automobile traveling in front.

For example, it is possible to switch between the use purposes of the projection light derived from the modulated light modulated by the modulation region 335A and the modulation region 335B, by switching between the phase distributions set to the modulation region 335A and the modulation region 335B in FIG. 22. For example, the switching between the use purposes of the projection light is performed before driving the automobile, and the set use purpose is fixed during driving. For example, the switching between the use purposes of the projection light is performed during driving of the automobile, and may also be performed in real time even during driving. For example, the switching between the use purposes of the projection light may be automatically performed under the control of an automatic driving system (not illustrated). The timing for switching between the use purposes of the projection light is not particularly limited.

Application Example 3

Figure 24:
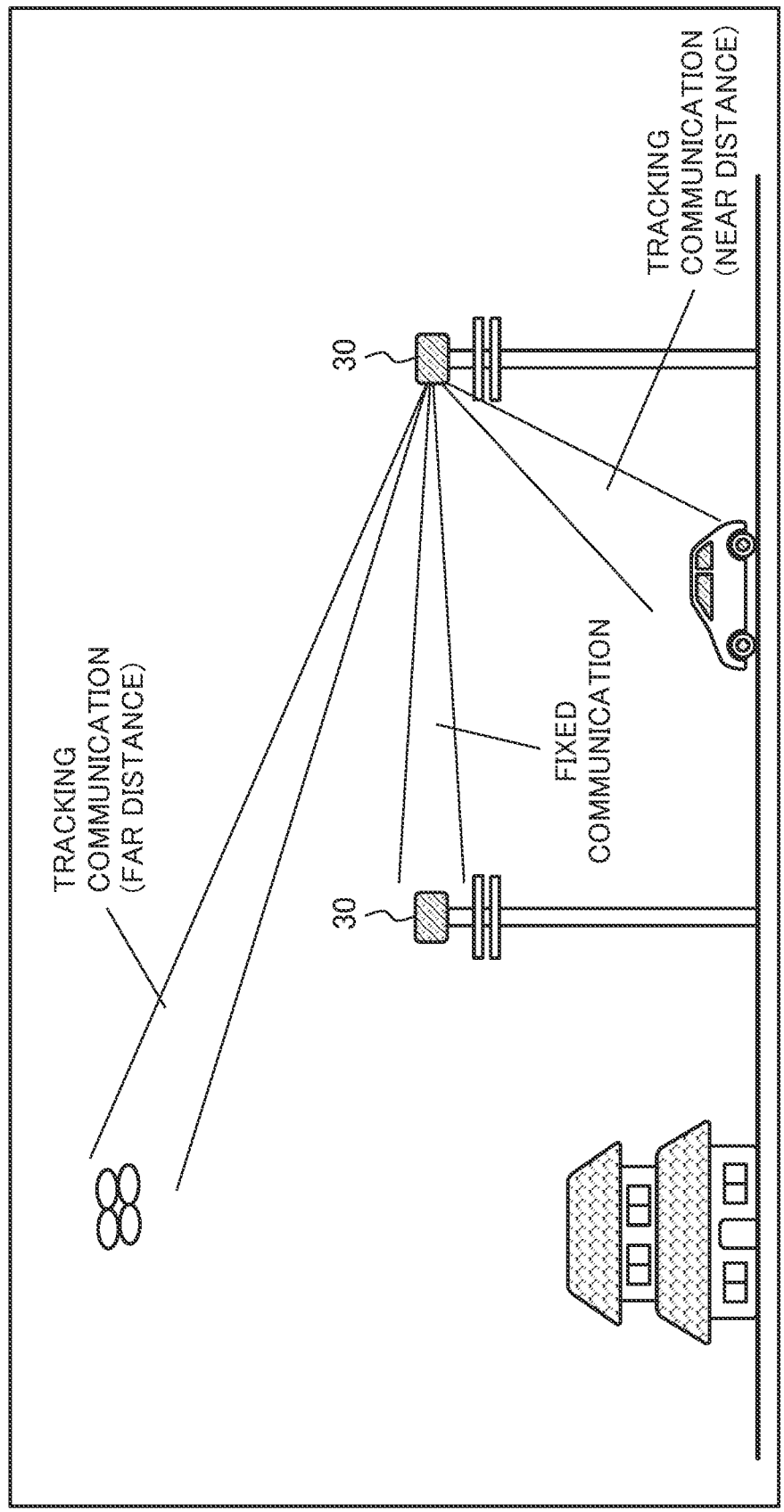
FIG. 24 is a conceptual diagram for describing Application Example 3 of the projection device according to the third example embodiment.

FIG. 24 is a conceptual diagram for describing Application Example 3 of the present example embodiment. In the present application example, the projection device 30 is arranged on an upper portion of a utility pole. In the present application example, the projection device 30 has a function of receiving projection light (also referred to as a spatial light signal) projected from another projection device 30 and decoding the spatial light signal. The projection device may have a function of performing wireless communication.

The upper portion of the utility pole has few obstacles and thus is suitable for spatial light communication for transmitting and receiving spatial light signals. For example, if a plurality of projection devices 30 is installed on the upper portion of a utility pole, it is possible to build a spatial light communication network in which spatial light signals are transmitted and received between the projection devices 30. For example, if a plurality of projection devices 30 constitutes a spatial optical communication network, the projection device 30 located in the middle of the network may be used to relay a spatial light signal transmitted from a certain projection device 30 to another projection device 30.

If projection light can be projected from the projection device 30 in a plurality of projection directions, the use purposes of the projection light may be distinguished according to the projection target. For example, fixed communication in which the projection direction is fixed is performed between the plurality of projection devices 30 whose positions are fixed. For example, a moving object such as an automobile or a drone and the projection device 30 perform tracking communication in which the projection device 30 tracks the position of the moving object and tracks the projection direction of the projection light toward the moving object being tracked. The tracking communication is achieved by the projection device 30 specifying the position of the moving object based on the image data captured by the imaging unit 28 and performing control to project the projection light toward the specified position of the moving object. In the case of tracking communication, if projection light is projected at different projection angles toward different moving objects that are near and far, it is also possible to transmit spatial light signals having the same level of energy in those moving objects. In this case, the projection angle of the projection light directed to the distant moving object may be decreased, and the projection angle of the projection light directed to the near moving object may be increased.

According to the present application example, it is possible to enable communication using spatial light signals between a plurality of projection devices 30 installed on different utility poles. According to the present application example, the projection device 30 tracks a moving object, and tracking communication is enabled to perform communication between the projection device 30 and the moving object. According to the present application example, since the projection direction and the projection angle can be arbitrarily changed, it is possible to flexibly perform tracking communication between a plurality of moving objects at different distances and the projection device 30. For example, wireless communication may be performed between the projection device 30 and a moving object such as an automobile or a drone or a wireless device installed in a house.

As described above, the projection device of the present example embodiment includes the light source, the spatial light modulator, the Fourier transform lens, the aperture, the imaging element, and the liquid crystal projection lens. The light source emits parallel light. The spatial light modulator includes a modulation part that modulates the phase of the parallel light emitted from the light source. The Fourier transform lens performs Fourier transform on the modulated light modulated by the modulation part to form an image. The aperture is arranged in the vicinity of the focal position of the Fourier transform lens. The aperture is a frame that blocks high-order light included in the light focused by the Fourier transform lens and limits an outer edge of the display area. The liquid crystal projection lens (also referred to as a liquid crystal lens) includes a liquid crystal region on which the light focused by the Fourier transform lens is incident. The liquid crystal projection lens projects the modulated light incident on a lens region dynamically formed in the liquid crystal region as projection light. The imaging unit images projection light in the projection direction. The control unit forms the lens region at a desired position in the liquid crystal region of the liquid crystal projection lens. The control unit sets the phase image corresponding to the projection light projected toward the projection target, to the modulation part of the spatial light modulator. The control unit controls the light source so that parallel light is emitted toward the modulation part to which the phase image is set. The control unit controls at least one of the projection direction and the projection angle of the projection light according to the light received by the light receiving element.

According to the present example embodiment, it is possible to project a high-definition image in accordance with the light receiving situation of the light receiving element by controlling the projection direction or the projection angle of the projection light in accordance with the light received by the light receiving element. For example, if the light receiving element receives an optical signal from a communication target, the projection device projects an optical signal corresponding to the received optical signal. For example, if the light receiving element receives light reflected by a distance measurement target, the projection device may calculate the distance to the distance measurement target based on the received light.

In an aspect of the present example embodiment, the projection device includes a plurality of light sources arranged to emit parallel light toward a plurality of modulation regions set to the modulation part of the spatial light modulator. The control unit controls the plurality of light sources so as to emit parallel light toward the modulation part to which different phase images are set in the plurality of modulation regions. According to the present aspect, different projection light can be projected in accordance with the projection target.

In one aspect of the present example embodiment, the light source can switch between modulation schemes of emitted parallel light. The control unit switches between the modulation schemes of parallel light emitted from the light source according to the use purpose. According to the present aspect, appropriately modulated projection light can be projected according to use purposes such as communication and distance measurement.

Fourth Example Embodiment

Next, a projection device according to a fourth example embodiment will be described with reference to the drawings. The projection device of the present example embodiment has a configuration in which the projection devices of the first to third example embodiments are simplified.

Figure 25:
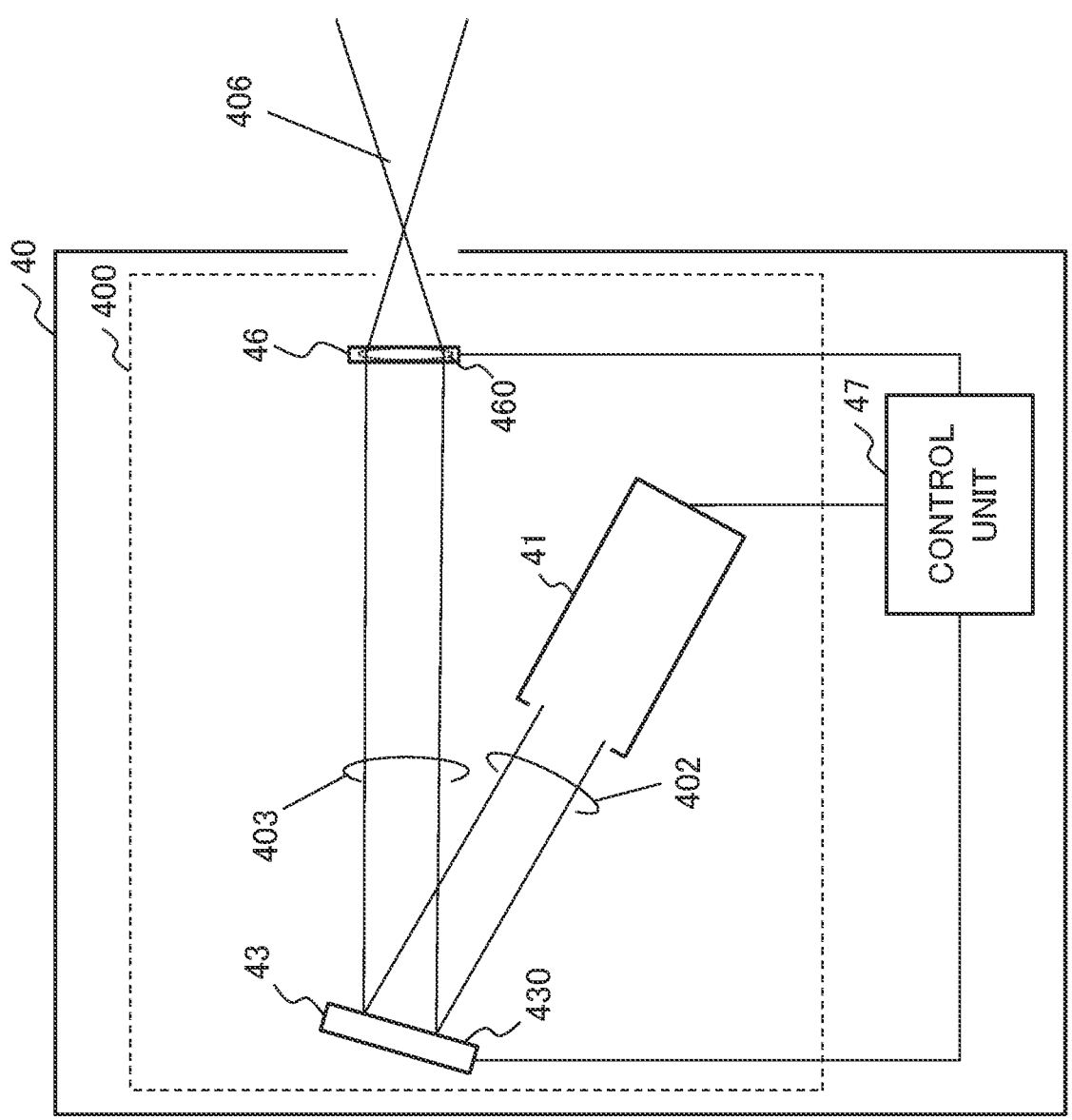
FIG. 25 is a conceptual diagram illustrating an example of a configuration of a projection device according to a fourth example embodiment.

FIG. 25 is a block diagram illustrating an example of a configuration of a projection device 40 of the present example embodiment. The projection device 40 includes a light source 41, a spatial light modulator 43, and a liquid crystal lens 46. FIG. 25 is a lateral view of the internal configuration of the projection device 40.

The light source 41 emits parallel light. The spatial light modulator 43 includes a modulation part 430 that modulates phase of parallel light 402 emitted from the light source 41. The liquid crystal lens 46 (also referred to as a liquid crystal projection lens) includes a liquid crystal region 460 on which modulated light 403 modulated by the spatial light modulator 43 is incident. The liquid crystal lens 46 projects the modulated light 403 incident on a lens region dynamically formed in the liquid crystal region 460 as the projection light 406. The control unit 47 forms the lens region at a desired position in the liquid crystal region 460 of the liquid crystal lens 46. The control unit 47 sets the phase image corresponding to the projection light 406 projected toward the projection target, to the modulation part 430 of the spatial light modulator 43. The control unit 47 controls the light source 41 so that the parallel light 402 is emitted toward the modulation part 430 to which the phase image is set.

FIG. 25 does not illustrate the Fourier transform lens is omitted. Practically, the modulated light 403 modulated by the modulation part 430 is Fourier-transformed and imaged using a Fourier transform lens (not illustrated), a virtual lens image formed in the modulation part 430 of the spatial light modulator 43, or the like.

As described above, according to the present example embodiment, the use of the liquid crystal lens including the liquid crystal region in which the lens region is formed at an arbitrary position as the projection lens makes it possible to project a high definition image in an arbitrary projection direction.

(Hardware)

Here, a hardware configuration for executing the processing of the control unit according to each example embodiment of the present disclosure will be described using a control device 90 of FIG. 26 as an example. For example, the control device 90 is implemented in the form of a microcomputer. The control device 90 in FIG. 26 is a configuration example for executing processing by the control unit of each example embodiment, and does not limit the scope of the present disclosure.

Figure 26:
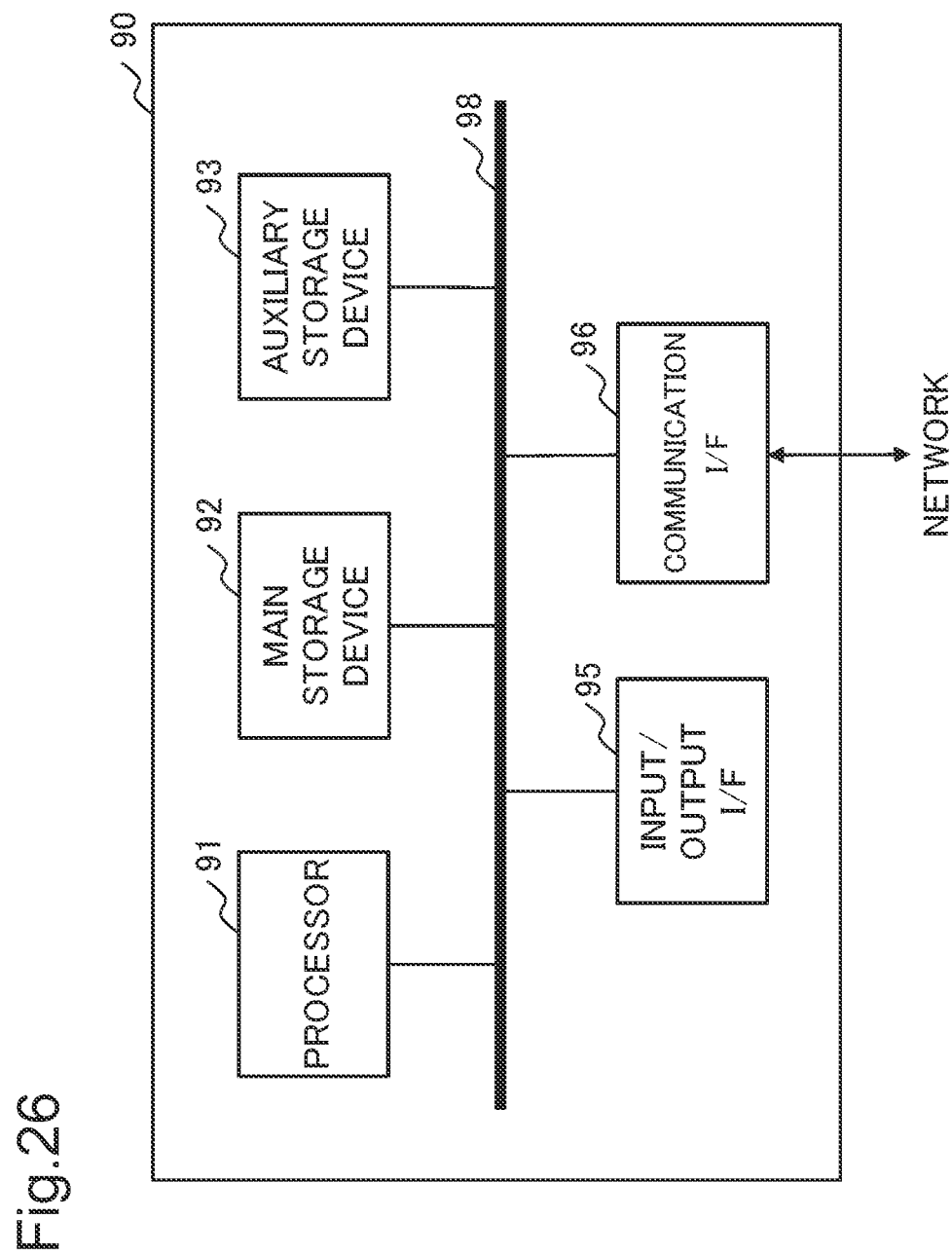
FIG. 26 is a conceptual diagram illustrating an example of a hardware configuration that implements a control unit of each example embodiment.

As illustrated in FIG. 26, the control device 90 includes a processor 91, a main storage device 92, an auxiliary storage device 93, an input/output interface 95, and a communication interface 96. In FIG. 26, the interface is abbreviated as an interface (I/F). The processor 91, the main storage device 92, the auxiliary storage device 93, the input/output interface 95, and the communication interface 96 are connected to each other in a data-communicable manner via a bus 98. The processor 91, the main storage device 92, the auxiliary storage device 93, and the input/output interface 95 are connected to a network such as the Internet or an intranet via the communication interface 96.

The processor 91 develops the program stored in the auxiliary storage device 93 or the like, in the main storage device 92. The processor 91 executes the program developed in the main storage device 92. In the present example embodiment, a software program installed in the control device 90 may be used. The processor 91 executes processing by the control unit according to the present example embodiment.

The main storage device 92 has an area in which a program is developed. Programs stored in the auxiliary storage device 93 or the like are developed in the main storage device 92 by the processor 91. The main storage device 92 is implemented by a volatile memory such as a dynamic random access memory (DRAM), for example. A nonvolatile memory such as a magnetoresistive random access memory (MRAM) may be configured/added as the main storage device 92.

The auxiliary storage device 93 stores various types of data such as programs. The auxiliary storage device 93 is implemented by a local disk such as a hard disk or a flash memory. The various types of data may be stored in the main storage device 92, and the auxiliary storage device 93 may be omitted.

The input/output interface 95 is an interface for connecting the control device 90 and a peripheral device based on a standard or a specification. The communication interface 96 is an interface for connecting to an external system or device through a network such as the Internet or an intranet based on a standard or a specification. The input/output interface 95 and the communication interface 96 may be unified as an interface connected to an external device.

An input device such as a keyboard, a mouse, or a touch panel may be connected to the control device 90 as necessary. These input devices are used to input information and settings. When the touch panel is used as an input device, the display screen of the display device may also serve as the interface of the input device. Data communication between the processor 91 and the input device may be mediated by the input/output interface 95.

The control device 90 may be provided with a display device for displaying information. When a display device is provided, the control device 90 preferably includes a display control device (not illustrated) for controlling display of the display device. The display device may be connected to the control device 90 via the input/output interface 95.

The control device 90 may be provided with a drive device. The drive device mediates reading of data and programs from a recording medium (program recording medium), writing of a processing result of the control device 90 to the recording medium, and the like, between the processor 91 and the recording medium. The drive device may be connected to the control device 90 via the input/output interface 95.

The above is an example of a hardware configuration for enabling the control unit according to each example embodiment of the present invention. The hardware configuration of FIG. 26 is an example of a hardware configuration for executing the arithmetic processing of the control unit according to each example embodiment, and does not limit the scope of the present invention. A program for causing a computer to execute processing related to the control unit according to each example embodiment is also included in the scope of the present invention. Further, a program recording medium in which the program according to each example embodiment is recorded is also included in the scope of the present invention. The recording medium can be implemented by an optical recording medium such as a compact disc (CD) or a digital versatile disc (DVD), for example. The recording medium may be implemented by a semiconductor recording medium such as a universal serial bus (USB) memory or a secure digital (SD) card. The recording medium may be implemented by a magnetic recording medium such as a flexible disk, or another recording medium. When a program executed by the processor is recorded in a recording medium, the recording medium corresponds to a program recording medium.

The components of the control unit of each example embodiment may be arbitrarily combined. The components of the control unit of each example embodiment may be implemented by software or may be implemented by a circuit.

Although the present invention has been described with reference to the example embodiments, the present invention is not limited to the above example embodiments. Various modifications that can be understood by those skilled in the art can be made to the configuration and details of the present invention within the scope of the present invention.

This application is based upon and claims the benefit of priority from Japanese patent application No. 2021-047566, filed on Mar. 22, 2021, the disclosure of which is incorporated herein in its entirety by reference.

REFERENCE SIGNS LIST 10, 20, 30, 40 Projection device
11, 21, 31, 41 Light source
13, 23, 33, 43 Spatial light modulator
14, 24, 34 Fourier transform lens
25, 35 Aperture
16, 26, 36 Liquid crystal projection lens
17, 27, 37, 47 Control unit
28 Imaging unit
39 Light receiving element
46 Liquid crystal lens
111 Emitter
112 Collimator
280 Lens
281 Imaging element
283 Image processing processor
285 Internal memory
287 Data output circuit

The invention claimed is:

1. A projection device comprising:
a light source configured to emit parallel light;
a spatial light modulator that has a modulation part that modulates a phase of the parallel light emitted from the light source;
a liquid crystal lens that includes a liquid crystal region on which modulated light modulated by the spatial light modulator is incident and that projects the modulated light incident on a lens region dynamically formed in the liquid crystal region as projection light; and
a controller including:
    a memory storing instructions; and
    a processor connected to the memory and configured to execute the instructions to:
        cause the lens region to be formed at a desired position in the liquid crystal region of the liquid crystal lens;
        set a phase image corresponding to the projection light projected toward a projection target, to the modulation part of the spatial light modulator; and
        control the light source to emit the parallel light toward the modulation part to which the phase image is set,
wherein the light source is configured to switch between modulation schemes of the parallel light to be emitted, and wherein the processor is configured to execute the instructions to switch between the modulation schemes of the parallel light to be emitted from the light source in accordance with a use purpose.

2. The projection device according to claim 1, wherein the processor is configured to execute the instructions to control a projection direction of the projection light by two-dimensionally moving the position where the lens region is formed in the liquid crystal region of the liquid crystal lens.

3. The projection device according to claim 1, wherein the processor is configured to execute the instructions to control a projection angle of the projection light by adjusting a refractive index of the lens region formed in the liquid crystal region of the liquid crystal lens.

4. The projection device according to claim 1, wherein the processor is configured to execute the instructions to cause a plurality of the lens regions to be formed in the liquid crystal region of the liquid crystal lens.

5. The projection device according to claim 4, wherein the processor is configured to execute the instructions to:
   cause the plurality of the lens regions different in at least one of the projection direction and the projection angle of the projection light to be formed in the liquid crystal region of the liquid crystal lens;
   individually set a plurality of the phase images corresponding to the projection light projected toward the different projection targets, to a plurality of modulation regions set to the modulation part of the spatial light modulator, in association with the plurality of the lens regions; and
   control the light source to emit the parallel light toward the modulation part in which the different phase images are set to the plurality of modulation regions.

6. The projection device according to claim 5, further comprising a plurality of the light sources arranged to emit the parallel light toward the different modulation regions,
   wherein the processor is configured to execute the instructions to control each of the plurality of light sources to emit the parallel light toward the modulation part in which the different phase images are set to the plurality of modulation regions.

7. The projection device according to claim 1, further comprising an imaging unit configured to image the projection direction of the projection light,
   wherein the processor is configured to execute the instructions to control at least one of the projection direction and the projection angle of the projection light in accordance with a position of the projection target included in an image captured by the imaging unit.

8. The projection device according to claim 1, further comprising a light receiving element that receives light coming from the projection direction of the projection light,
   wherein the processor is configured to execute the instructions to control at least one of the projection direction and the projection angle of the projection light in accordance with the light received by the light receiving element.

9. A projection method for controlling a projection device including a light source configured to emit parallel light, a spatial light modulator that has a modulation part that modulates a phase of the parallel light emitted from the light source, and a liquid crystal lens that includes a liquid crystal region on which modulated light modulated by the spatial light modulator is incident and that projects the modulated light incident on a lens region dynamically formed in the liquid crystal region as projection light, the method comprising:
   causing the lens region to be formed at a desired position in the liquid crystal region of the liquid crystal lens;
   setting a phase image corresponding to the projection light projected toward a projection target, to the modulation part of the spatial light modulator, and
   controlling the light source to emit parallel light toward the modulation part to which the phase image is set,
   wherein the light source is configured to switch between modulation schemes of the parallel light to be emitted, and
   wherein the method further comprises switching between the modulation schemes of the parallel light to be emitted from the light source in accordance with a use purpose.

* * * * *